US010340778B2

(12) United States Patent
Flynn

(10) Patent No.: US 10,340,778 B2
(45) Date of Patent: Jul. 2, 2019

(54) PARALLEL MAGNETIC CIRCUIT MOTOR

(75) Inventor: Charles J. Flynn, Greenwood, MO (US)

(73) Assignee: QM Power, Inc., Kansas City, MO (US)

( * ) Notice: Subject to any disclaimer, the term of this patent is extended or adjusted under 35 U.S.C. 154(b) by 0 days.

(21) Appl. No.: 12/907,858

(22) Filed: Oct. 19, 2010

(65) Prior Publication Data

US 2011/0089775 A1  Apr. 21, 2011

Related U.S. Application Data

(60) Provisional application No. 61/253,018, filed on Oct. 19, 2009.

(51) Int. Cl.
| H02K 1/17 | (2006.01) |
| H02K 19/10 | (2006.01) |
| H02K 21/44 | (2006.01) |
| H02K 21/38 | (2006.01) |
| H02K 1/04 | (2006.01) |
| H02K 1/00 | (2006.01) |

(52) U.S. Cl.
CPC .............. H02K 21/44 (2013.01); H02K 1/17 (2013.01); *H02K 1/00* (2013.01); *H02K 1/04* (2013.01); *H02K 19/10* (2013.01); *H02K 21/38* (2013.01)

(58) Field of Classification Search
CPC .. H02K 1/00; H02K 1/04; H02K 1/17; H02K 21/04; H02K 23/04; H02K 21/26; H02K 21/28; H02K 21/30; H02K 21/32; H02K 21/325; H02K 21/44; H02K 19/10; H02K 19/12; H02K 19/103; H02K 41/02; H02K 37/20

USPC ...... 310/154.01, 49, 46, 159, 162–164, 166, 310/172–173, 179–181, 184, 190; 318/254.1

See application file for complete search history.

(56) References Cited

U.S. PATENT DOCUMENTS

| 2,505,130 | A | * | 4/1950 | Maynard ................ H02K 21/44 310/155 |
| 2,917,699 | A | * | 12/1959 | Grant ................... H03H 7/0115 310/111 |
| 2,993,134 | A | * | 7/1961 | Harvey ................... H02K 1/17 310/154.47 |
| 3,439,200 | A | * | 4/1969 | Saito et al. ................ 310/49.45 |
| 3,452,229 | A | * | 6/1969 | Pimlott, Jr. ............ H02K 19/24 310/168 |
| 3,984,711 | A | * | 10/1976 | Kordik ........................ 310/49.46 |
| 4,011,479 | A | * | 3/1977 | Volkrodt ....................... 310/186 |
| 4,883,999 | A | * | 11/1989 | Hendershot ............ H02K 29/06 310/179 |
| 4,995,159 | A | * | 2/1991 | Hancock et al. .............. 29/596 |
| 5,086,442 | A | * | 2/1992 | Gemmel et al. ............... 378/132 |
| 5,672,925 | A | * | 9/1997 | Lipo et al. ............... 310/154.11 |

(Continued)

FOREIGN PATENT DOCUMENTS

| FR | 2685566 | * | 8/2001 | ............ H02K 21/44 |
| GB | 2428902 | * | 2/2007 | ............ H02K 19/10 |

(Continued)

Primary Examiner — Burton S Mullins
(74) Attorney, Agent, or Firm — Polsinelli PC

(57) ABSTRACT

A parallel magnetic circuit motor includes a rotor without magnets and a stator with magnets. The rotor, stator and windings are configured to produce unidirectional current and torque with electrically independent phases.

44 Claims, 31 Drawing Sheets

(56) References Cited

U.S. PATENT DOCUMENTS

| | | | | |
|---|---|---|---|---|
| 5,825,113 | A * | 10/1998 | Lipo | H02K 21/44 |
| | | | | 310/162 |
| 6,051,904 | A * | 4/2000 | Akemakou | 310/171 |
| 6,075,302 | A * | 6/2000 | McCleer | 310/166 |
| 6,242,834 | B1 * | 6/2001 | Akemakou | 310/162 |
| 6,246,561 | B1 * | 6/2001 | Flynn | 361/147 |
| 6,342,746 | B1 * | 1/2002 | Flynn | H02K 1/12 |
| | | | | 310/181 |
| 6,563,248 | B2 * | 5/2003 | Fujita | H02K 1/17 |
| | | | | 310/154.02 |
| 6,864,608 | B2 * | 3/2005 | Kang et al. | 310/154.02 |
| 6,946,938 | B1 * | 9/2005 | Pedersen | H02K 19/02 |
| | | | | 335/296 |
| 7,148,590 | B1 * | 12/2006 | Lampson | 310/12.18 |
| 7,348,706 | B2 * | 3/2008 | Ionel | H02K 1/148 |
| | | | | 310/216.009 |
| 8,129,881 | B2 * | 3/2012 | Hosle | 310/216.109 |
| 2007/0029890 | A1 * | 2/2007 | Deodhar | H02K 21/44 |
| | | | | 310/216.074 |
| 2008/0272664 | A1 | 11/2008 | Flynn | |
| 2009/0021089 | A1 | 1/2009 | Nashiki | |
| 2009/0160391 | A1 * | 6/2009 | Flynn | H02K 21/44 |
| | | | | 318/701 |

FOREIGN PATENT DOCUMENTS

| | | | | |
|---|---|---|---|---|
| GB | 2454170 A | * | 5/2009 | H02K 19/10 |
| WO | WO 2008/092746 | * | 8/2008 | H02K 1/16 |
| WO | 2008-119055 | * | 10/2008 | |

\* cited by examiner

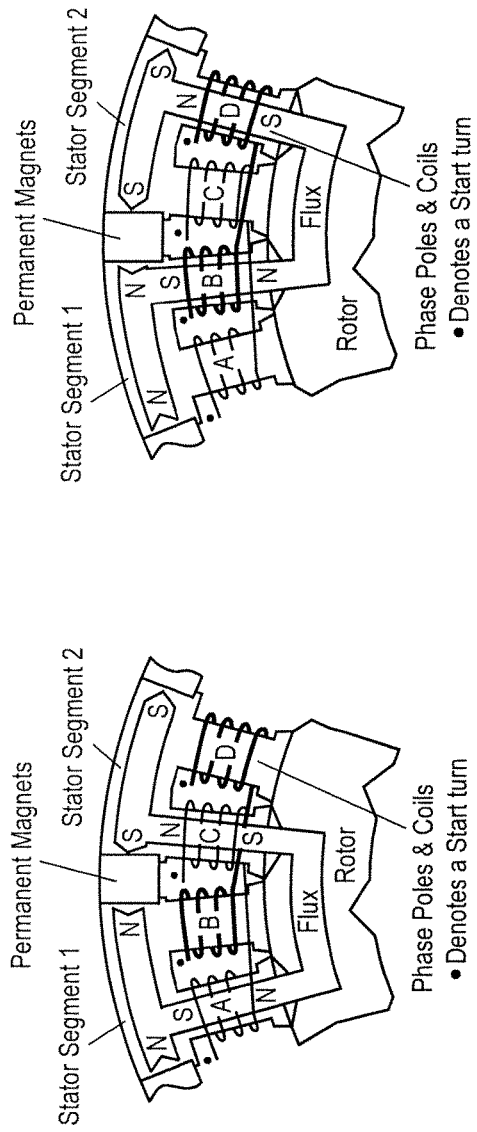
FIG. 17
FIG. 18
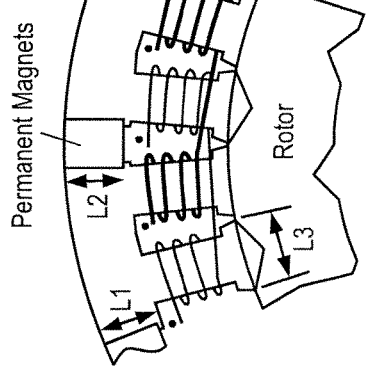
FIG. 19

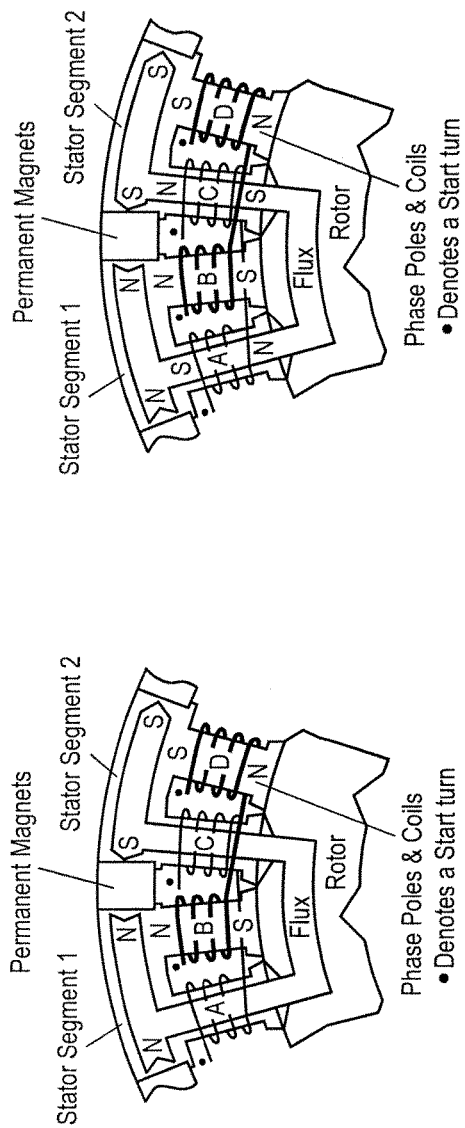
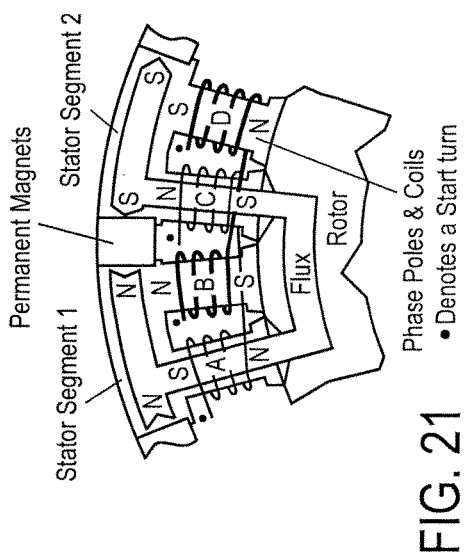
FIG. 20A
FIG. 20B
FIG. 21

CCW TIMING TABLE USING POLE DESIGNATOR

| GEO DEG | | PHASE 1 | | | | PHASE 2 | | | | PHASE 1' | | | | PHASE 2' | | | |
|---|---|---|---|---|---|---|---|---|---|---|---|---|---|---|---|---|---|
| | | A | B | C | D | A | B | C | D | A | B | C | D | A | B | C | D |
| 0~5 | STEP 1 | ON | | ON | | ON | | | | | | ON | ON | | | | ON |
| 5~10 | STEP 2 | ON | | ON | | | ON | | ON | | | ON | ON | ON | | ON | |
| 10~15 | STEP 3 | | ON | | ON | | ON | | ON | ON | | | | ON | | ON | |
| 15~20 | STEP 4 | | ON | | ON | ON | | ON | | ON | ON | | | | ON | | ON |

FIG. 23

CCW TIMING TABLE USING POLE DESIGNATOR

| GEO DEG | | PHASE 1 | | | | PHASE 2 | | | | PHASE 3 | | | | PHASE 1' | | | | PHASE 2' | | | | PHASE 3' | | | |
|---|---|---|---|---|---|---|---|---|---|---|---|---|---|---|---|---|---|---|---|---|---|---|---|---|---|
| | | A | B | C | D | A | B | C | D | A | B | C | D | A | B | C | D | A | B | C | D | A | B | C | D |
| 0~4 | STEP 1 | ON | | ON | | | | | | ON | | | | | | | | | | | | | | | ON |
| 4~8 | STEP 2 | ON | | ON | | ON | | ON | | ON | ON | | | | | | | | | | | | | | ON |
| 8~12 | STEP 3 | ON | | ON | | ON | | ON | | ON | ON | ON | | | | ON | | | | | | | | | ON |
| 12~16 | STEP 4 | | ON | | ON | ON | | ON | | | ON | ON | ON | ON | | ON | ON | | | | | | ON | ON | |
| 16~20 | STEP 5 | | ON | | ON | | ON | | ON | | | ON | ON | ON | ON | | ON | ON | | ON | ON | ON | ON | ON | |
| 20~24 | STEP 6 | | ON | | ON | | ON | | ON | ON | | | ON | ON | ON | ON | ON | ON | ON | ON | ON | | ON | ON | ON |

FIG. 25

CCW TIMING TABLE USING POLE DESIGNATOR

| GEO DEG | STEP | PHASE 1 | | | | PHASE 2 | | | | PHASE 3 | | | | PHASE 4 | | | | PHASE 5 | | | | PHASE 6 | | | |
|---|---|---|---|---|---|---|---|---|---|---|---|---|---|---|---|---|---|---|---|---|---|---|---|---|---|
| | | A | B | C | D | A | B | C | D | A | B | C | D | A | B | C | D | A | B | C | D | A | B | C | D |
| 0~2 | STEP 1 | ON | | ON | | | ON | | ON | | ON | | ON | | ON | | ON | ON | | ON | | ON | | ON | |
| 2~4 | STEP 2 | ON | | ON | | | ON | | ON | | ON | | ON | | ON | | ON | ON | | ON | | ON | | ON | |
| 4~6 | STEP 3 | ON | | ON | | ON | | ON | | | ON | | ON | | ON | | ON | | ON | | ON | ON | | ON | |
| 6~8 | STEP 4 | ON | | ON | | ON | | ON | | | ON | | ON | | ON | | ON | | ON | | ON | ON | | ON | |
| 8~10 | STEP 5 | ON | | ON | | ON | | ON | | ON | | ON | | | ON | | ON | | ON | | ON | | ON | | ON |
| 10~12 | STEP 6 | ON | | ON | | ON | | ON | | ON | | ON | | | ON | | ON | | ON | | ON | | ON | | ON |
| 12~14 | STEP 7 | | ON | | ON | ON | | ON | | ON | | ON | | ON | | ON | | | ON | | ON | | ON | | ON |
| 14~16 | STEP 8 | | ON | | ON | ON | | ON | | ON | | ON | | ON | | ON | | | ON | | ON | | ON | | ON |
| 16~18 | STEP 9 | | ON | | ON | | ON | | ON | ON | | ON | | ON | | ON | | ON | | ON | | | ON | | ON |
| 18~20 | STEP 10 | | ON | | ON | | ON | | ON | ON | | ON | | ON | | ON | | ON | | ON | | | ON | | ON |
| 20~22 | STEP 11 | | ON | | ON | | ON | | ON | | ON | | ON | ON | | ON | | ON | | ON | | ON | | ON | |
| 22~24 | STEP 12 | | ON | | ON | | ON | | ON | | ON | | ON | ON | | ON | | ON | | ON | | ON | | ON | |

FIG. 27

| Product Comparisons (Automotive - Electrical and Hybrid-Electric Vehicles) | | | |
|---|---|---|---|
| | QM Power | UQM | Raser |
| Peak Power (kW) | 50 | 50 | 42 |
| Continuous Power (kW) | 45 | 30 | 21 |
| length (mm) | 150 | 252 | 152 |
| width (mm) | 250 | 280 | 305 |
| weight (KG) | 32 | 41 | 41.5 |
| weight (lb) | 70.4 | 90.2 | 91.3 |
| Power Density - Weight | | | |
| Minimum (0.40 kW/lb), Goal (0.65 kW/lb) | 0.71 | 0.55 | 0.46 |
| QM Power Advantage | | 28% | 54% |
| Peak Efficiency | 97% | 90% | 92% |
| @ expected speed (rpm) | 5,000 | 5,000 | 5,000 |
| Maximum Speed (rpm) | 20,000 | 5,000 | 6,000 |
| http://www.uqm.com/pdfs/HiTor%20(2.4.09).pdf | | | |
| http://www.rasertech.com/motors-and-drives/products/motors/p42-motor-generator | | | |

FIG. 29

PARALLEL MAGNETIC CIRCUIT MOTOR

CROSS-REFERENCE TO RELATED APPLICATION

This application claims priority to U.S. Provisional Patent Application 61/253,018, filed Oct. 19, 2009, entitled "Parallel Magnetic Circuit Motor", the contents of which are incorporated herein by reference.

FIELD OF THE INVENTION

This invention relates generally to motors. More particularly, this invention is directed toward a parallel magnetic circuit motor.

BACKGROUND

It is desirable to optimize the magnetic circuit used in permanent magnet [PM] machines to obtain the highest power density and efficiency possible. Since PM machines typically have a relatively narrow high efficiency region on their fixed commutation (uncontrolled) torque vs. speed curve, many rotating machine technologists focus on increasing the motor size to power out ratio and the motor controller to enhance the overall performance of PM machines.

The focus on the controller to enhance the performance of PM machines is predicated on the belief that PM machines already operate at shear stress levels fairly close to their component materials' physical limits. This statement is misleading, however, since the true limiting factors are actually the permanent magnets and the geometry of the machine in which they are used, not the magnetically soft core materials as implied.

Wound field machines such as series wound, switched or variable reluctance machines can operate at shear stress levels at the material limits. Since these machines use field coils, rather than permanent magnets to produce the static magnetic field, the only limitation to the magnitude of the static field is the current carrying capacity of the copper wire. Such machines can reach the physical limits of the magnetically soft core material and produce high gap flux densities, but also result in increased $I^2R$ losses in the wound field coils and an increase in weight due to the field coils.

Permanent magnets are used in rotating machines to replace the field coils that produce static magnetic fields to provide three primary benefits:
1) A reduction in the size of the machine since the magnets are physically smaller than the coils they replace;
2) A reduction in the weight of the machine since the magnets are physically lighter than the coils they replace; and
3) The elimination of the $I^2R$ losses attributed to the field coils, thus reducing heat losses and therefore improving the overall machine efficiency.

However, replacing a rotating machine's field coils with permanent magnets has the following trade-offs/limitations:
1) The energy product of a permanent magnet is fixed, thereby limiting the controllability of the static magnetic field;
2) State of the art permanent magnets cannot achieve the gap flux densities that can be achieved with wound field coils;
3) Permanent magnets do not make good structural components and can create bonding issues when placed on a machine's rotor;
4) Permanent magnets are more sensitive to temperature; and
5) The gap flux density is determined by the energy product of the permanent magnet and will always be less than $B_r$, or approximately 1.25 Tesla for neodymium magnets with a typical gap flux density of 0.8–~1 Tesla with no power in the phase coils. The field intensity [H] of the phase coils will drive the gap density higher but cannot exceed ~$B_r$ of the permanent magnets. If the flux in the air gap coupling a permanent magnet and a phase coil exceeds $B_r$, the amount greater than $B_r$ will be primarily uncontrolled fringing flux. The permanent magnet's domains between $B_r$ and $B_{max}$ require a greater amount of energy to bring them into temporary magnetic alignment.

This is not meant to diminish the importance of the motor controller for improving performance but rather to state that mathematically, analytically and empirically it can be shown that the current and commonly accepted PM machine geometries cannot achieve the shear stress levels of wound field machines. The typical PM geometry is based on the concept of simply replacing a wound field coil with a PM without fully realizing or accepting the limitations and consequences of such a simplistic approach. Therefore, it would be desirable to provide an improved PM circuit motor.

SUMMARY

A parallel magnetic circuit motor has a rotor without magnets and a stator with magnets. Stator segments have windings. The rotor, stator and windings are configured to produce unidirectional current and torque with electrically independent phases.

The disclosed Parallel Magnetic Circuit [PMC] or Parallel Path Magnetic Technology [PPMT] geometry provides solutions for many of the limitations imposed by merely replacing a machine's wound field coils with permanent magnets. Improvements include:
  Increased power density by producing gap flux densities equal to those of a field wound motor;
  Increased efficiency by maintaining the $I^2R$ loss reduction and weight benefits for using permanent magnets rather than wound field coils;
  Increased efficiency and reliability from the ability to redirect the static field of a permanent magnet without applying a destructive opposing field; and
  Increased reliability from negating issues associated with attaching or bonding permanent magnets to a rotating machine's rotor.

Notable improved performance attributes include intrinsic higher efficiency over a wider operating range, a rectangular power output curve, higher air gap flux densities which result in higher power density and no rotor attached components. These performance characteristics make a PMC machine a vastly superior solution compared to several incumbent PM machine designs. However, in order for a PMC PM machine to successfully compete with a greater share of incumbent solutions, multiphase machine geometries need to be identified that could apply the PMC theory of operation.

BRIEF DESCRIPTION OF THE DRAWINGS

The invention is more fully appreciated in connection with the following detailed description taken in conjunction with the accompanying drawings, in which:

FIG. 17 shows how the flux from the permanent magnets adds and is directed through a given set of stator poles by selectively energizing phase coils.

FIG. 18 illustrates magnetic polarities utilized in accordance with an embodiment of the invention.

FIG. 19 illustrates permanent magnet pole face adjustments utilized in accordance with an embodiment of the invention.

FIG. 20 shows two uses of bidirectional current in a phase coil.

FIG. 21 illustrates stored energy dissipation in accordance with an embodiment of the invention.

FIG. 23 contains the timing table for a PMC two phase machine by phase and pole designators.

FIG. 25 shows the timing sequence of a three phase PMC machine.

FIG. 27 shows the timing sequence of a six phase PMC machine.

FIG. 29 shows performance comparison versus market alternatives.

DETAILED DESCRIPTION

In order to understand the problems solved by the magnetic circuits or geometries used in accordance with the invention (occasionally referred to as a QM Power PMC machine), the limitations associated with commonly used PM machine geometries first needs to be examined. This section addresses the principles (and shortcomings) of the commonly used magnetic circuit within non-PMC brush and brushless three Phase PM motors.

Brushless three Phase PM motors use overlapped phase windings wound on a magnetically soft iron stator or rotor. During motor operation, these phase windings produce magnetic fields that attract or repel permanent magnets mounted on the rotor [brushless] or that comprise the stator [brush]. The overlapped phase windings also reduce the magnetically soft iron forming a pole for a phase, since winding slots must be present in that pole to accommodate the other phases.

A first limitation of commonly used PM machine geometries relates to attracting and repelling forces. In particular, the Maxwell stress integral in the air gaps for the same amount of applied phase coil current is different for an electromagnetic field that is repelling a permanent magnet than one attracting a permanent magnet.

Figure 1:
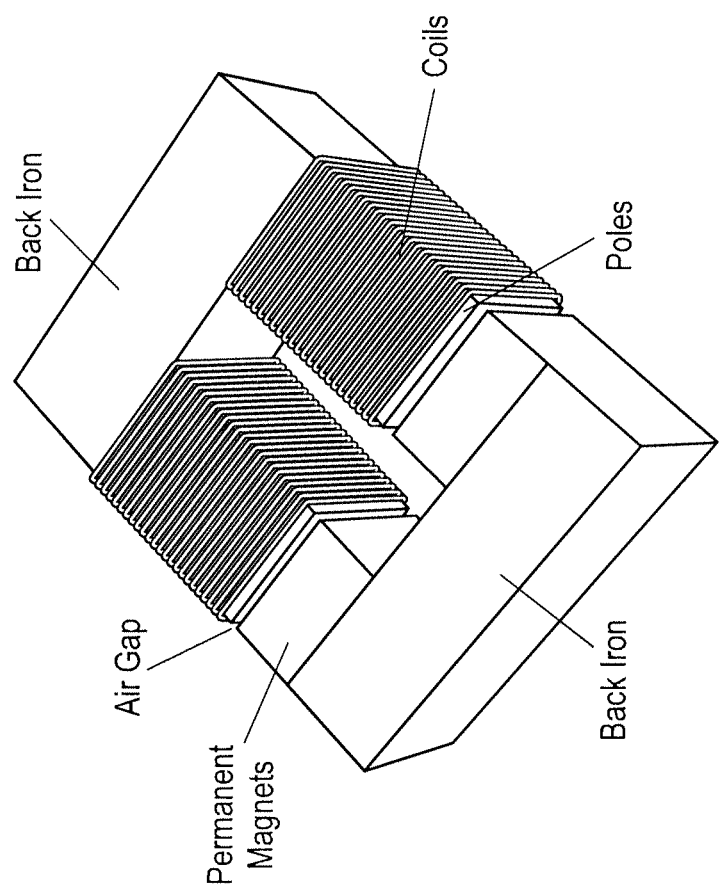
FIG. 1 shows a simple magnetic circuit.

The simple magnetic circuit of FIG. 1, is used to prove this statement. FIG. 1 illustrates permanent magnets, back iron, air gaps, poles and coils. When a phase coil is energized in a manner to attract a permanent magnet, the magnetic fields of the phase coil and permanent magnet couple and the attractive force immediately begins to increase with the magnitude of the current in the phase coil. A graph of the attractive force between the poles and the permanent magnet versus the phase coil current is in shown in FIG. 2.

Since flux from the permanent magnet, with no current in the phase coils, already permeates the magnetically soft core, the attracting force does not begin at zero.

Figure 3:
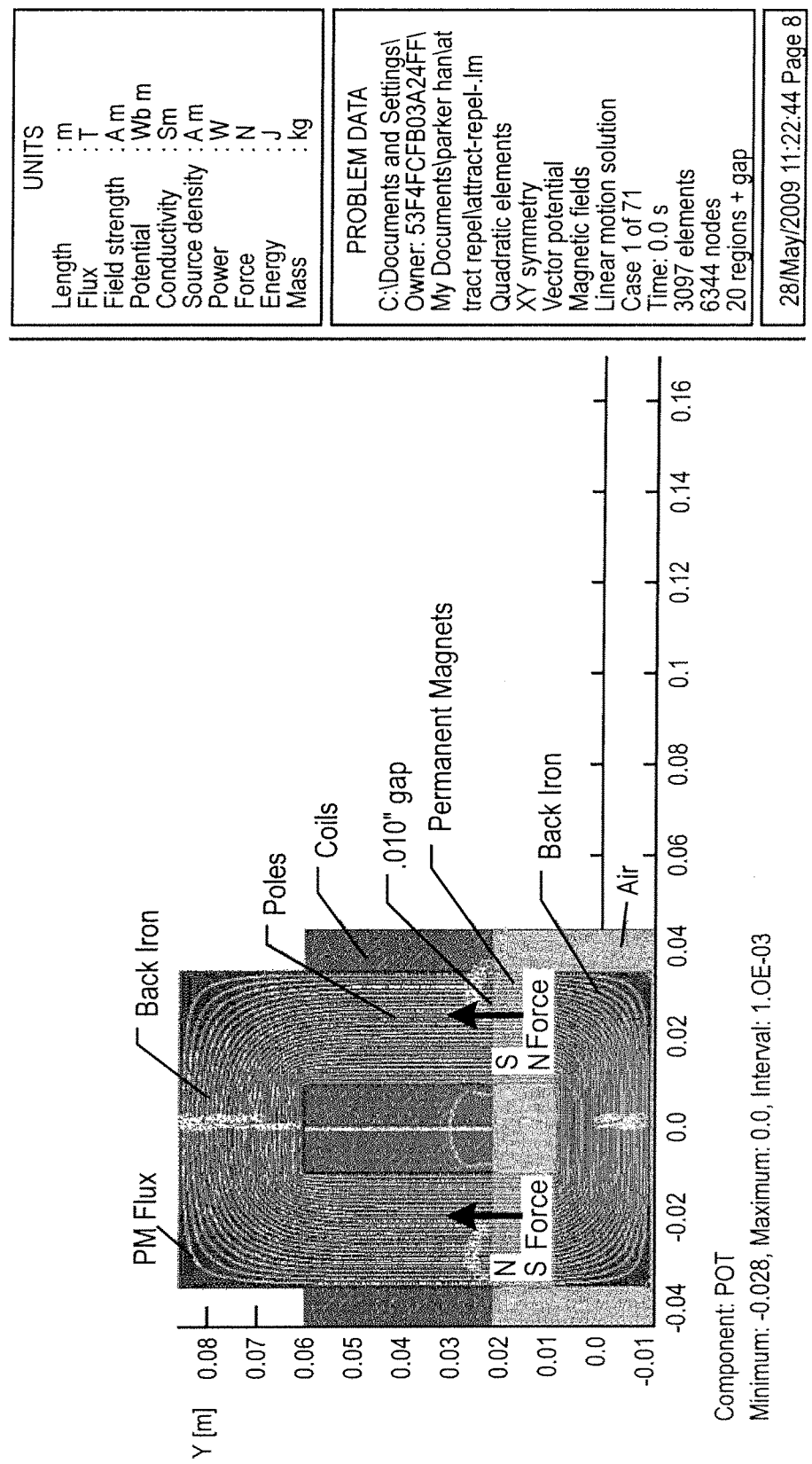
FIG. 3 shows flux from the permanent magnet, with no current in the phase coils, already permeates the magnetically soft core which creates an attracting force.

When a phase coil is energized in a manner to repel a permanent magnet, the magnetic fields of the phase coil and permanent magnet oppose. Flux from the permanent magnet, with no current in the phase coils, already permeates the magnetically soft core which creates an attracting force as shown in FIG. 3.

When current flows in the phase coil, the flux produced by the coil must first oppose and displace the flux from the permanent magnets. As the magnitude of the phase coil current increases, producing a flux [L*i] that opposes the preexisting permanent magnet flux, the attracting force is reduced but no repelling force is present until the preexisting permanent magnet flux is first displaced.

Figure 4:
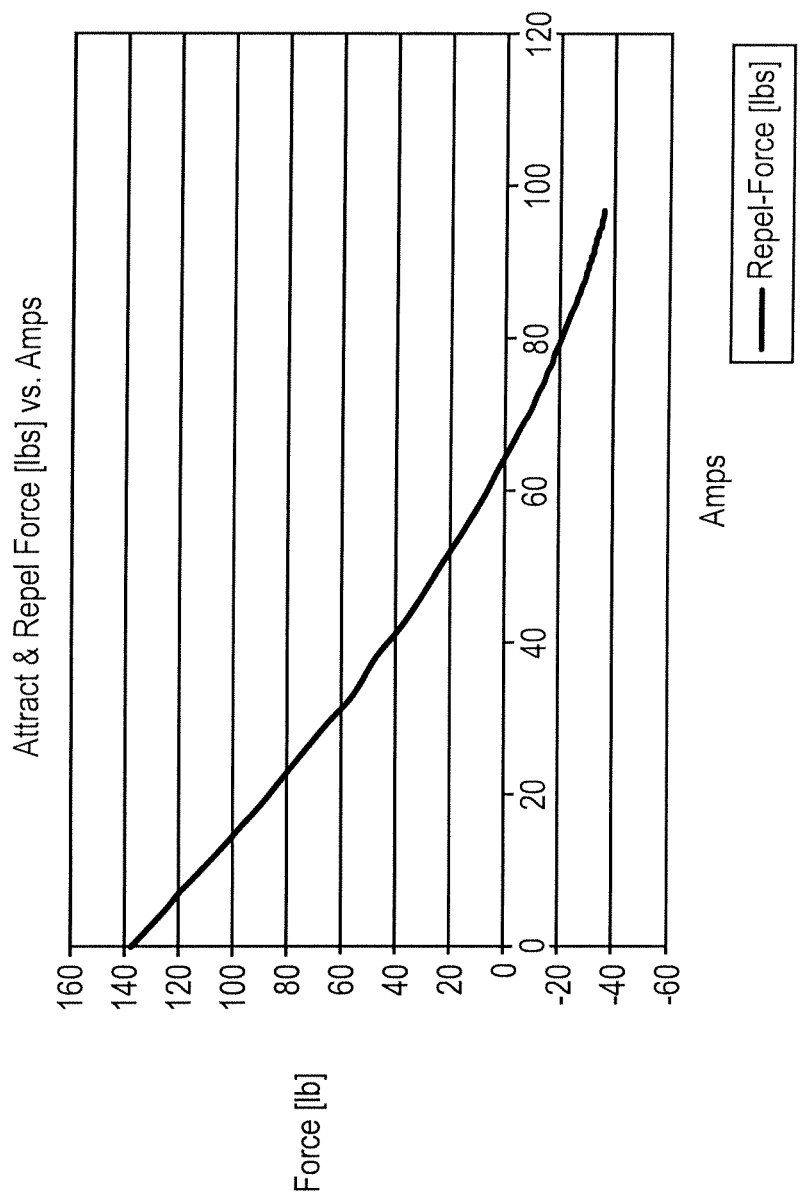
FIG. 4 shows a graph of the attracting and repelling force between the poles and the permanent magnet versus the phase coil current.

A graph of the attracting and repelling force between the poles and the permanent magnet versus the phase coil current is shown in FIG. 4. The graph begins at a nonzero attracting force for both cases, however repelling forces are not present until the point where the force curve passes through zero and produces negative values.

Figure 2:
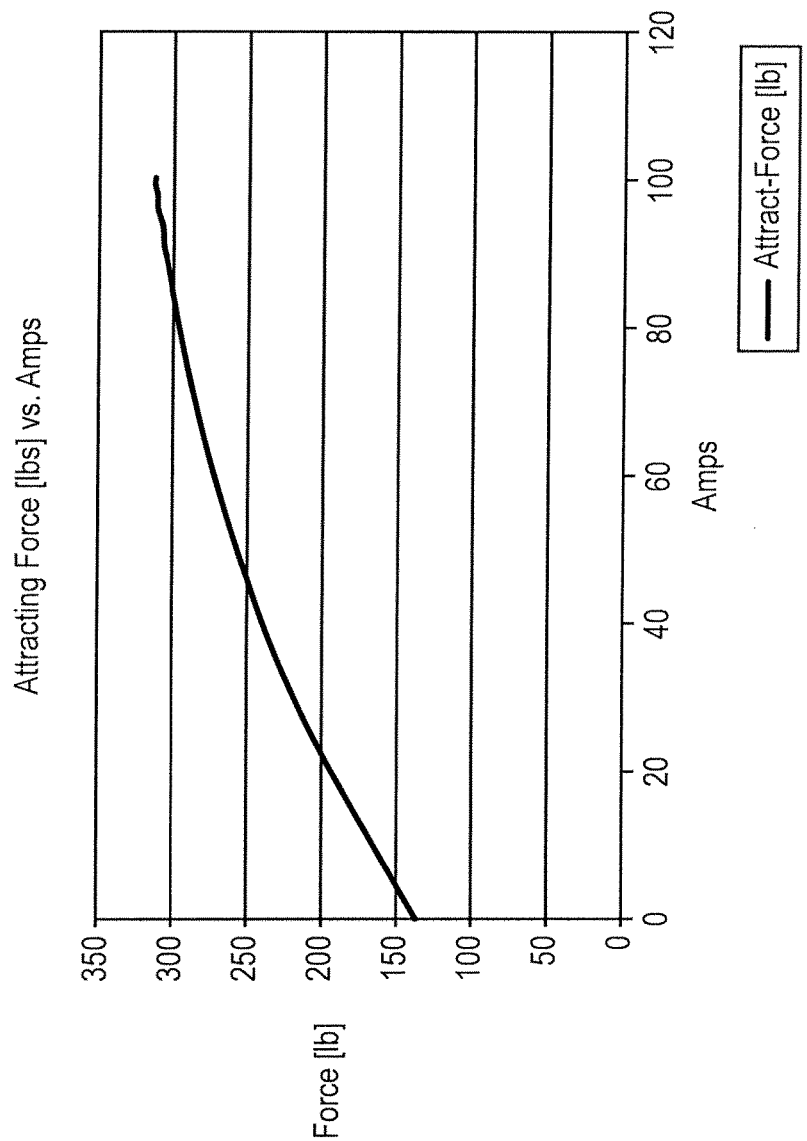
FIG. 2 shows graph of the attractive force between the poles and the permanent magnet versus the phase coil current.

As can be seen in the graphs in FIGS. 2 and 4, at the maximum applied phase coil current, a repelling force of just 36 lbs is created as opposed to 312 lbs for an attracting force at the same applied current.

The equations for calculating Maxwell stress are quadratic and imply that for the same applied phase current, the attracting and repelling magnetic forces will remain at the same ratio no matter what size magnets are used. The phase coil turns could be increased resulting in increased resistance. This increased resistance requires a higher input voltage with a lower current [I=V/R] but the power [P=VI] remains the same.

The above magnetic circuit is used to illustrate that the attracting and repelling forces are not the same when identical current is applied to the phase coils due to the fact that the permanent magnets produce a flux through the magnetically soft core material without current in the coils. It further illustrates that when a phase coil is energized to repel a permanent magnet, the majority of the current is used to displace the opposing permanent magnet flux rather than producing a repelling force or 'pushing' torque to move the rotor to the next pole.

Figure 5:
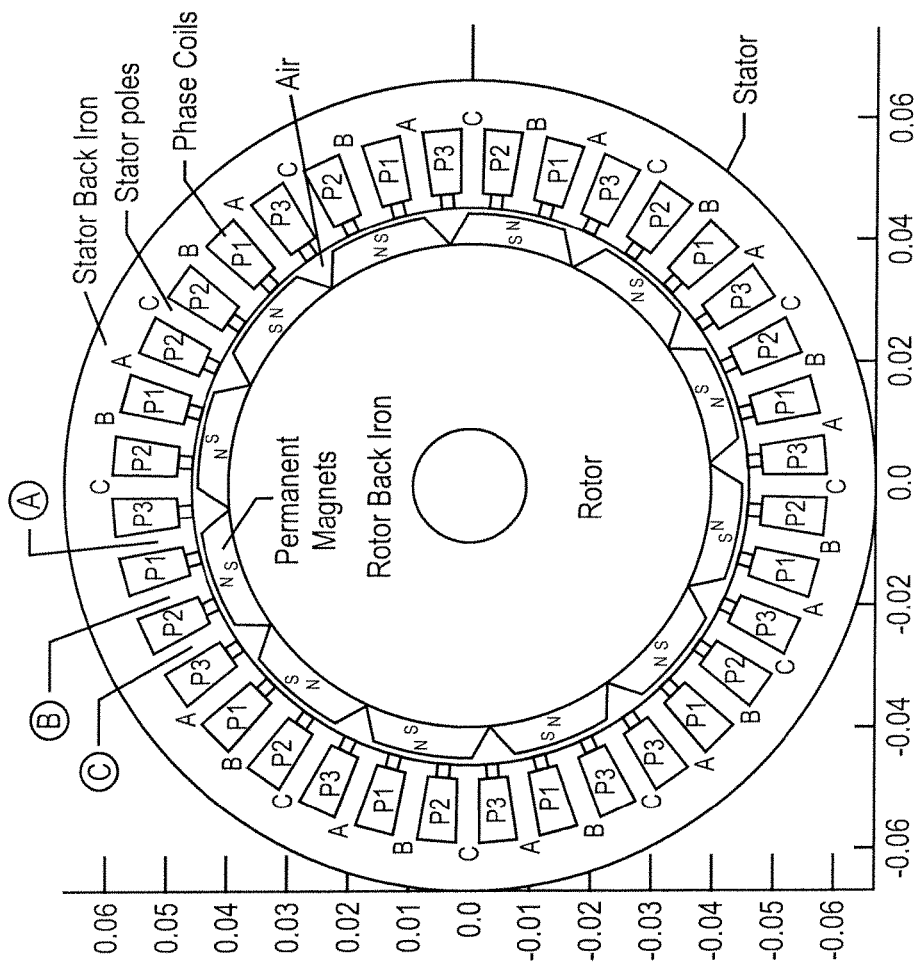
FIG. 5 illustrates a three phase PM machine in accordance with an embodiment of the invention.

FIG. 5 illustrates these principles when reduced to practice in an actual three phase PM machine.

Considering PH1, if the rotor is turning in a clockwise (CW) direction, with a permanent magnet aligned with the PH1 poles as shown, pole(s) A would be applying an attracting force on a rotor magnet producing a major contribution to torque, pole(s) C would be applying a repelling force on a rotor magnet with a minor contribution to torque, and pole(s) B would have negligible or no contribution to torque. (Note that phase 1 poles A, B, and C combine to form a single phase 1 pole since this machine utilizes overlapped phases and winding slots for the other phases, which must also be present in the phase 1 pole. Therefore, phase 1 has 12 poles with each pole consisting of sub-poles A, B, and C.)

The three overlapped phases maintain this relationship as the rotor turns where a 'leading' pole is always attracting a rotor permanent magnet and a 'trailing' pole is always repelling a rotor permanent magnet, independent of rotational direction, and the central pole will have little to no contribution to torque. For the other phases [PH1 pole A=PH2 pole B=PH3 pole C], [PH1 pole B=PH2 pole C=PH3 pole A] and [PH1 pole C=PH2 pole A=PH3 pole B].

Figure 6:
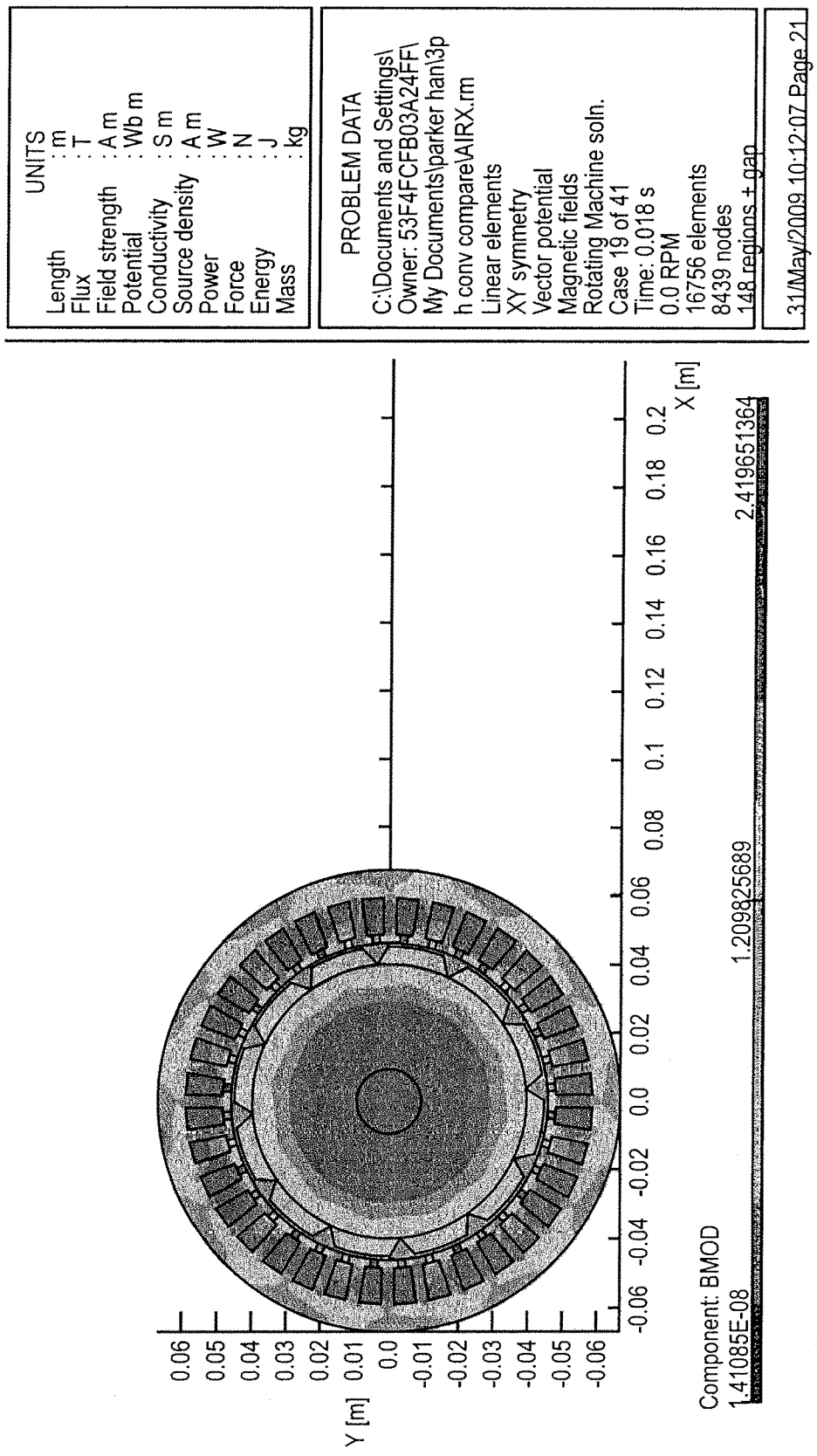
FIG. 6 illustrates flux densities for the machine of FIG. 8.

If phase 1 is energized to $V_{peak}$ the flux densities for the machine in FIG. 5 are as shown in FIG. 6.

The maximum gap density at the pole tips for this machine geometry would be approximately equal to $B_r$ of the permanent magnet, with the integral values for the entire PH1 pole significantly lower than $B_r$. The 'trailing' or repelling poles cannot reach $B_r$, as shown in FIG. 6.

Figure 7:
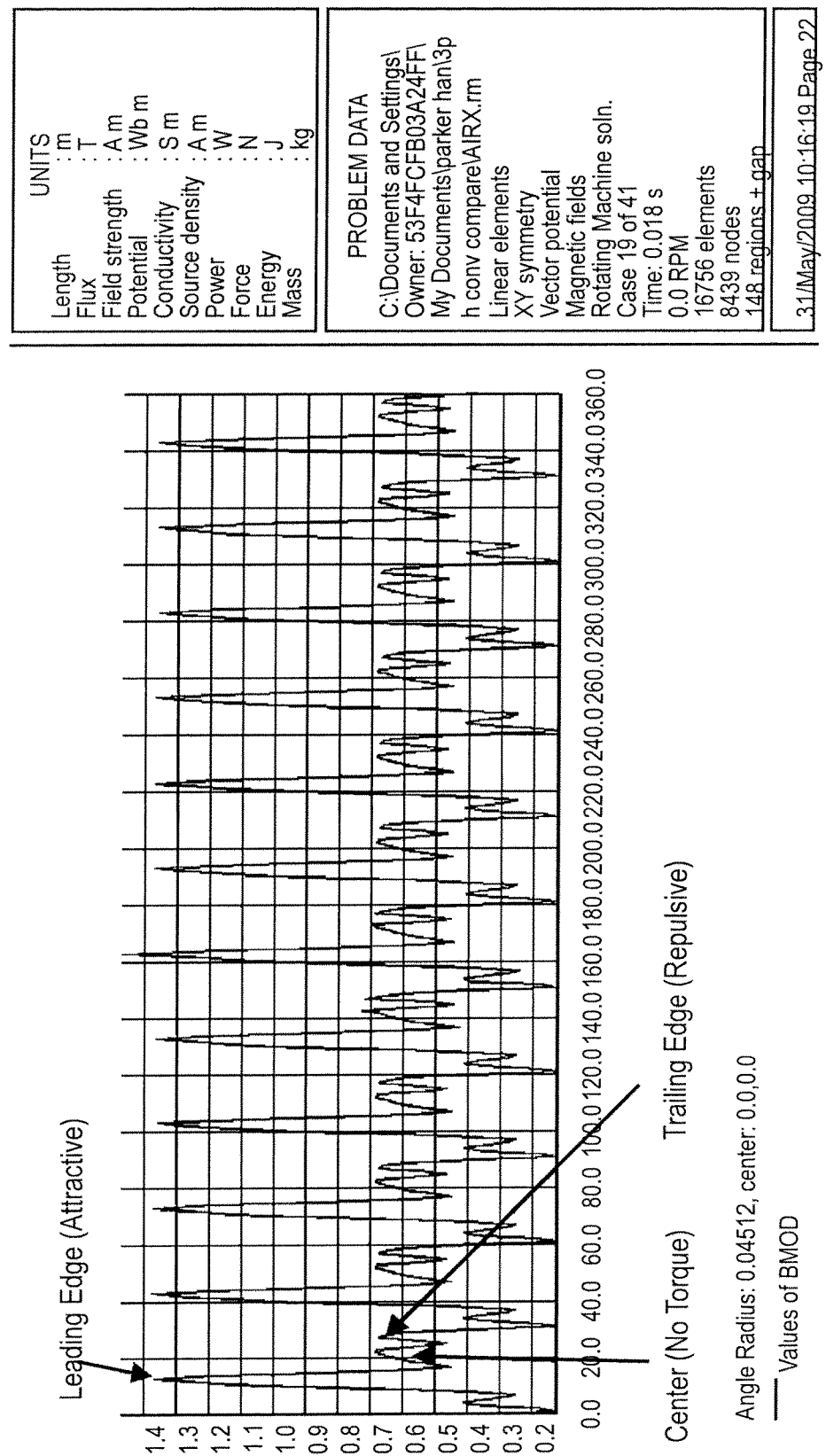
FIG. 7 shows the flux density in the air gap over 360 degrees.

FIG. 7 shows the flux density in the air gap over 360 degrees. The 12 attracting phase one poles can clearly be seen and, as suggested by the simple magnetic circuit analysis in the first part of this section, the significant torque contribution is produced by the attracting fields; the repelling fields contribute very little when compared to the total torque. If one looks more closely at FIG. 6, it can be seen that the attracting field on the 'leading' end of a permanent magnet raises the load line to $B_r$ at the pole tips while the repelling fields on the trailing end of the same permanent magnet are driven below ½ Br. While strong opposing fields can be present using neodymium magnets owing to their high coercive force, a PM machine that uses ceramic magnets to the phase current levels shown in FIG. 6 would eventually demagnetize those ceramic magnets and render the system inoperable. That is why most PM machines that use ceramic magnets give a current rating that cannot be exceeded so as to prevent destructive opposing fields from being applied to the permanent magnets. Further, at any given angular position only about 30% of the area of the rotor to stator gap interface contribute significantly to the production of torque.

Figure 8:
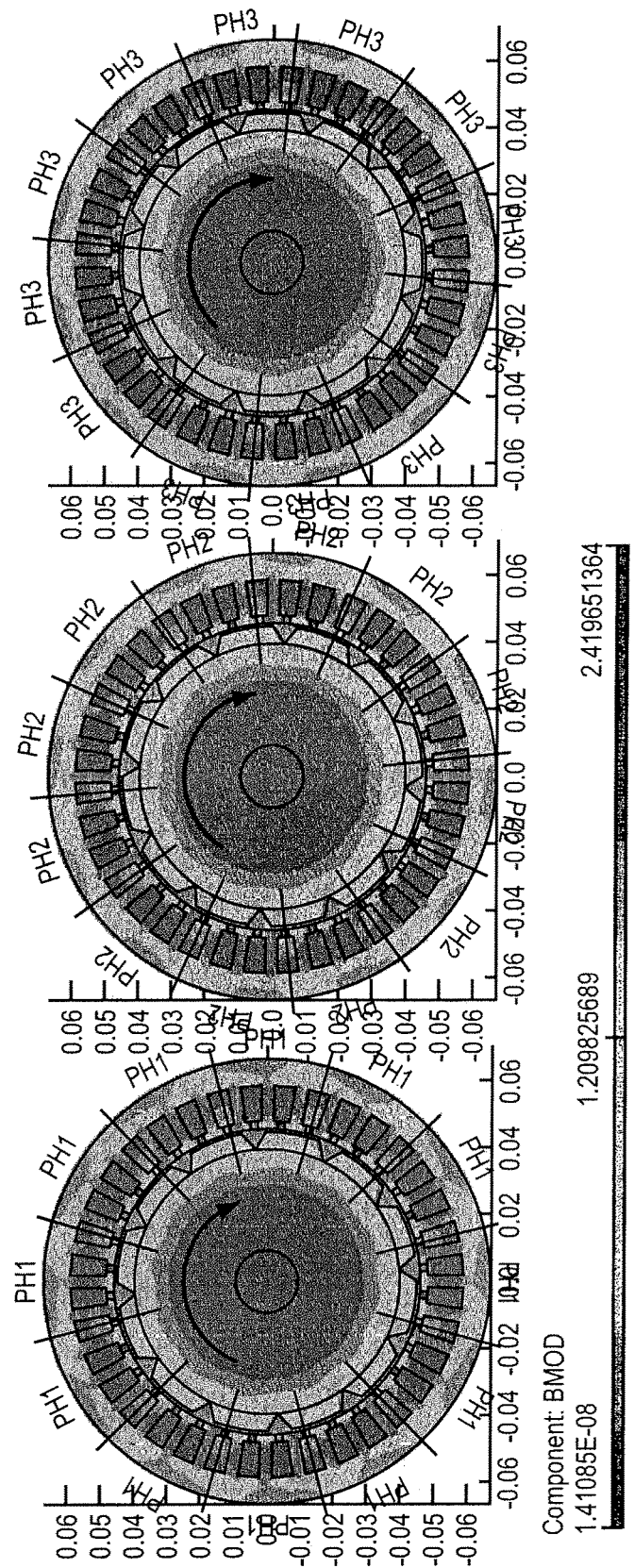
FIG. 8 shows the flux densities as a rotor permanent magnet aligns with each of the three phases.

The gap flux densities shown in FIG. 7 are flux densities for phase one (of the three phases) when a permanent magnet is aligned with that phase. FIG. 8 shows the flux densities as a rotor permanent magnet aligns with each of the three phases.

In summary, the torque delivered to the shaft will always be the sum of the repelling and attracting forces in a PM machine's air gap. The attracting forces will always be dominant and the repelling forces will always have a higher loss when compared to their current versus the force produced.

Unless high coercive force permanent magnets are used, the phase currents must be limited to prevent demagnetization of the permanent magnets.

It follows that only about 30% of the area of the rotor to stator air gap interface is utilized to produce the majority of the torque; specifically, the poles producing an attracting force for a three phase PM machine like the one shown in FIG. 5.

Another limitation associated with traditional PM machine geometries relates to flux saturation. In particular, due to overlapped phase winding slots, the magnetically soft phase poles will saturate before the air gap can have a mean flux density equal to $B_r$ of the permanent magnets.

That is due to the reduced pole area remaining after sacrificing some to accommodate the overlapped winding slots to form the three phases. FIG. 6, shows a flux density of ~2.1 Tesla in the phase pole that is energized to couple with a PM in an attracting manner. The air gap peak flux density between the rotor PM and the energized phase poles at their tips is ~1.35 Tesla peak flux density, as shown in FIG. 7. The integral of the flux density across a pole would be much less than $B_r$ for the permanent magnet.

For example in the machine shown in FIG. 5, phase one has slots to accommodate the phase two and three windings, segmenting what would be a phase one pole into 3 poles. If we look at only the phase one poles in the machine in FIG. 5 with the winding slots for phases 2 and 3 removed, a phase one pole would be as shown in FIG. 9.

Figure 10:
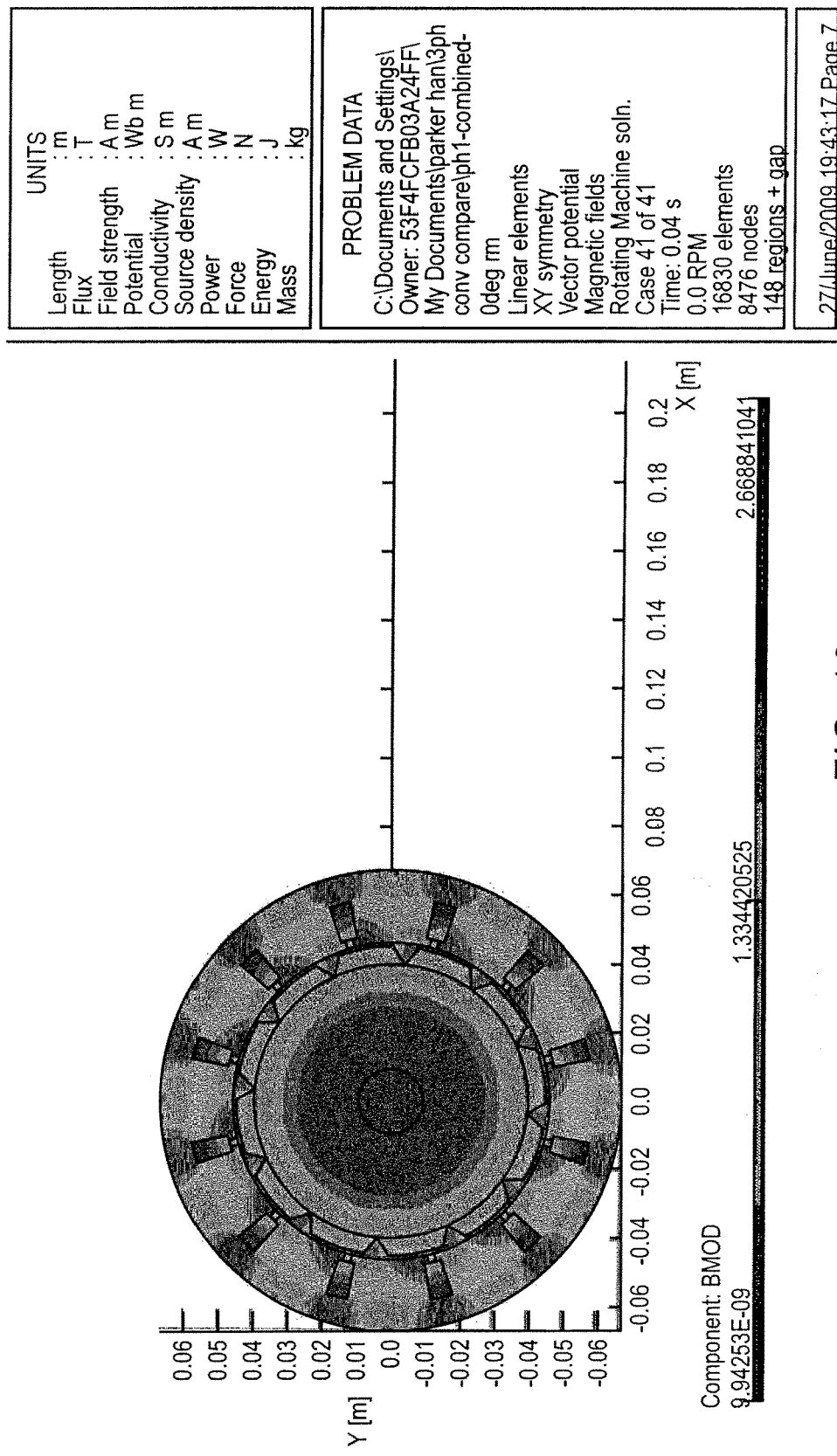
FIG. 10 shows the flux density for phase 1 if the winding slots for phases two and three are removed.
Figure 11:
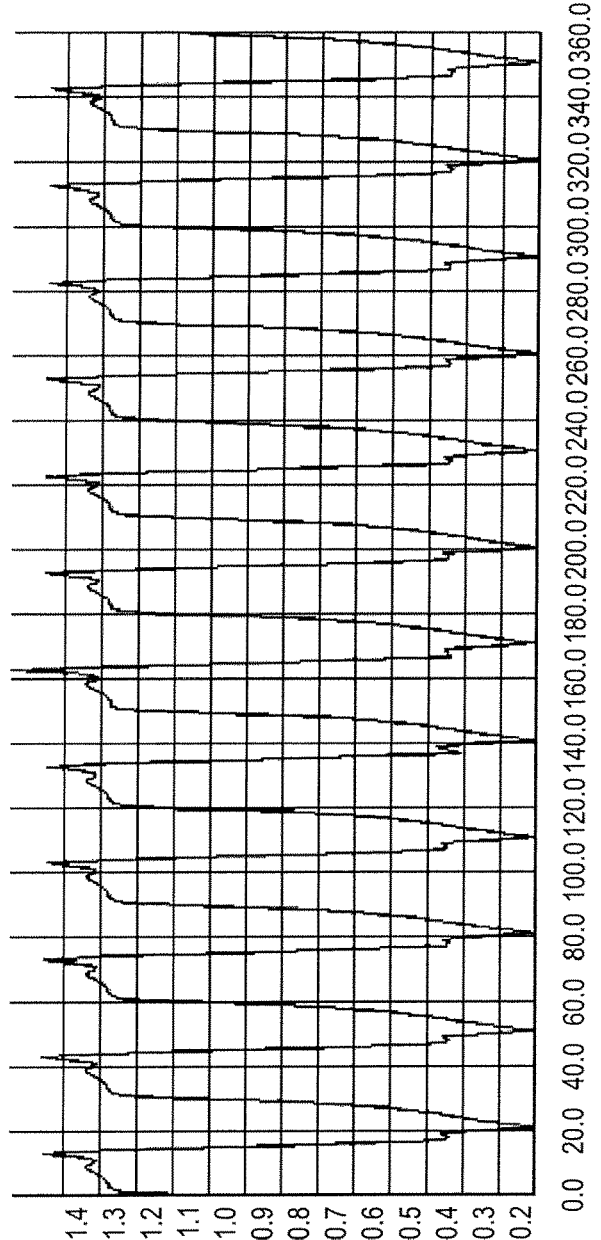
FIG. 11 shows the flux density in the air gap over 360 degrees for phase one with the winding slots for phases two and three removed and the same applied current as was used to create FIG. 7.

FIG. 10 illustrates magnetic flux for this device. FIG. 11 shows the flux density in the air gap over 360 degrees for phase one with the winding slots for phases two and three removed and the same applied current as was used to create FIG. 7. Again, the 12 attracting phase one poles can clearly be seen, and with the flux clearly at or around $B_r$ over a much greater portion of the area of the pole face. The torque produced by the geometry used in FIG. 11 was 36 N-m compared to the 24 N-m produced in FIG. 7, an increase of about 33%.

Figure 9:
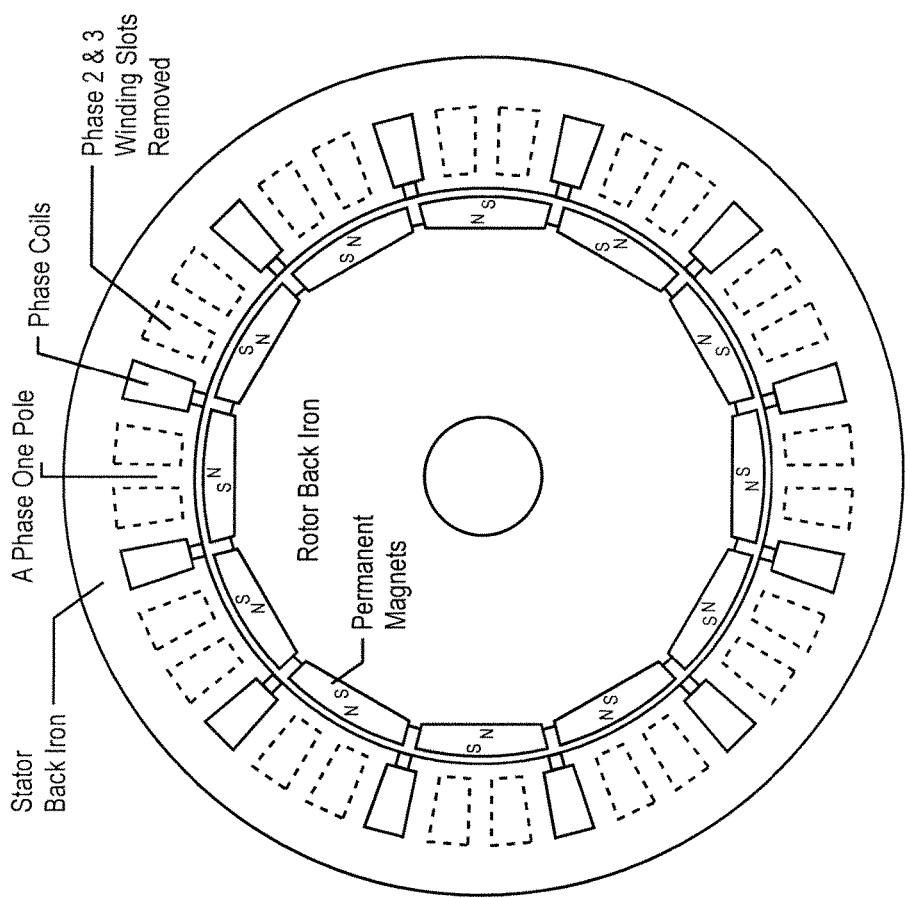
FIG. 9 illustrates a phase one pole with phase 2 and 3 winding slots removed.

The above is not to suggest that the geometry shown in FIG. 9 represents a preferred PM machine geometry but rather to demonstrate that the loss of core material to winding slots for overlapped phases has a significant effect on the amount of torque produced for the same applied current (i.e., the geometry in FIG. 9 could be implemented but it probably would not be optimal). The conclusion that should be drawn from this is that a multiphase PM machine geometry that does not have overlapping phase windings would result in a higher power density machine.

Another limitation of traditional PM machine geometries relates to gap flux density. When the machine's phase coils are not energized, the gap density for aligned poles will be ~½ the $B_r$ of the permanent magnet if the phase coils are in series with the permanent magnets; when energized they would add to the field intensity [H] to increase the flux density across the gap. The maximum possible gap flux density, since the pole face of the magnet is essentially the same area as the poles comprising a machine phase and both are in series with one another (for aligned poles), will be equal to $B_r$ of the permanent magnet, or 1.2-~1.3 Tesla with neodymium magnets when the phase coil has current flowing through it adding to [H].

Figure 12:
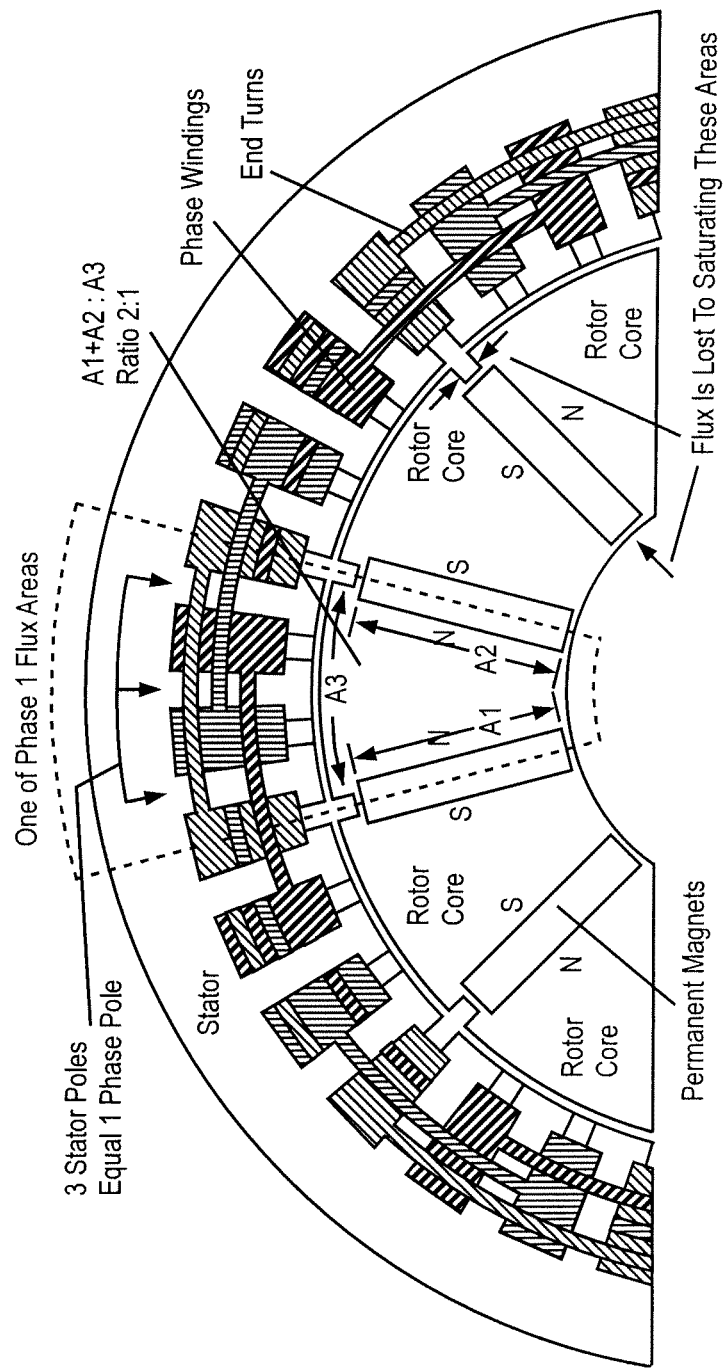
FIG. 12 illustrates a design with higher air gap flux densities.

Competitive attempts to increase the gap flux densities in permanent magnet machines have been implemented that increase the pole face area of the rotor permanent magnet to be greater than the pole area, thus allowing for higher air gap flux densities (areas A1+A2>A3 by 2:1, as shown in FIG. 12). This is done by placing more than one magnet in slots in the rotor or alternately by shaping one magnet into a 'U' shape (not shown) directed toward a stator pole.

Such a solution for increasing the air gap flux density entails problems. The rotor would require a greater depth, thus adding weight, and would be more complicated since the magnets would need to be placed in the magnetically soft rotor iron. Thin structural metal at the ends of the permanent magnets to keep the poles of the permanent magnets from shorting would result in a fragile rotor design. A PMC magnetic circuit provides a solution for increasing the gap flux densities while mitigating the problems associated with the above solution.

Notwithstanding the heavier, fragile and more complicated rotor, it still does not address the loss of power density due to repelling fields and the small flux area on a stator pole due to overlapped phases. Therefore, even if this were a good solution for increasing the air gap flux density it does not provide a complete solution for overcoming some of the other limitations of the widely used three phase permanent magnet motor geometry.

Figure 13:
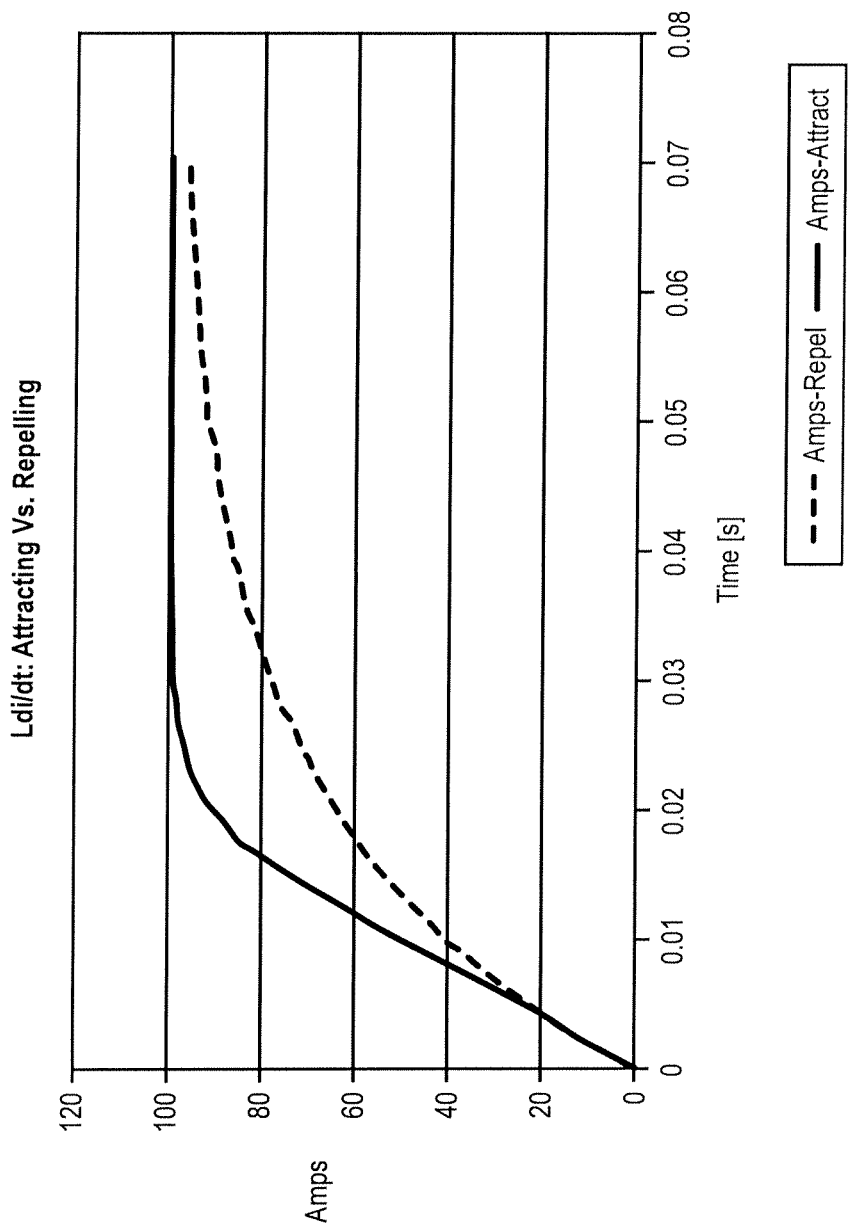
FIG. 13 illustrates rise time for phase coils as a function of attracting and repelling a permanent magnet.

Another limitation associated with traditional PM machine geometries relates to current rise times. In particular, the exponential rise time for the phase coils to obtain $I_{max}$ is different when a phase coil is energized to attract a permanent magnet than when repelling a permanent magnet (as shown in the graph in FIG. 13). The data in this graph was captured using both an FEA analysis and from empirical data.

When energy is applied to a phase coil the expanding magnetic field is aided when the flux from the permanent magnet is in the same direction [attracting] as the expanding magnetic field of the phase coils and opposed when the flux from the permanent magnet opposes the expanding field of the phase coils [repelling]. Therefore when the permanent magnet flux is in the same direction as the expanding phase coil field, the current rise time is faster and when the permanent magnet flux is in the opposite direction the current rise time is slower.

Torque versus speed in a rotating PM machine is a function of the current through the Back Electromotive Force [BEMF]. The instantaneous current is a function of the phase coil's resistance, inductance and the applied voltage and BEMF over a given time interval or:

$$i = \left(\frac{Ea - E_{bemf}}{R_{coil}}\right) \cdot \left(1 - \xi^{-t \cdot \frac{R_{coil}}{L_{coil}}}\right) \quad \text{Equation 1}$$

The time interval is the time it takes for a rotor pole to sweep past a stator pole. Torque is a function of the integration of [i] over this time interval. Therefore, a faster current rise time has an impact on the speed at which the rotating machine develops maximum power out. The [L] term is modified by the PM field orientation relative to the direction the current is flowing in a phase coil. In the machine shown in FIG. 5, the phase coil's magnetic field orientation with respect to the permanent magnet's field is equally distributed between opposing and aiding over time.

Therefore, the notion that a PM machine geometry containing only attracting (or aiding) fields would have superior performance in both power density and efficiency could easily be proved mathematically.

1. PMC Formulas & Principles

The voltage formula for one phase in a PMC machine is:

$$V_{in} = R \cdot I + \frac{d(\lambda(\theta, i))}{dt} \quad \text{Equation 2}$$

Lambda in the above equates to:

$$\lambda(\theta,I) = L(\theta) \cdot i + K_{pm}(\theta) \quad \text{Equation 3}$$

The K term, PM flux linkage, gives rise to the dominant torque in a PMC machine, and also its speed voltage. L is constant within 2% over Theta in a PMC machine and is therefore independent of Theta. The torque that corresponds to the above is given in equation 4. Note that although L is considered to be independent of Theta, implying that the inductance term could be stated simply as Li, for mathematical correctness dL(Theta,i) is used so as to account for any potential variation in L, no matter how small it may be.

$$\text{Torque} = \frac{1}{2} \cdot i^2 \cdot \frac{dL(\theta, i)}{d\theta} + i \frac{dK_m(\theta)}{d\theta} + \text{Torque}_{cog}(\theta) \quad \text{Equation 4}$$

Figure 14:
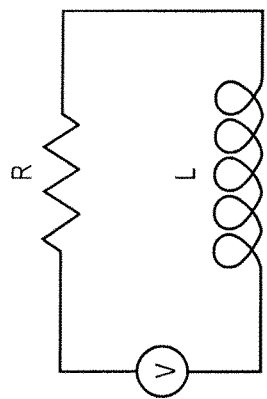
FIG. 14 shows a model for one phase of a motor as a series resistor, inductor and voltage source.

The model for one phase of the motor proper is a series resistor, inductor and voltage source, as depicted in FIG. 14.

Electrical energy that enters the machine can go to one of three places (in the absence of core losses). First, it can be lost as heat in the windings; the winding resistance accounts for this. Second, it can be stored in the magnetic fields in the machine; the inductance accounts for this. Finally, it can be converted to mechanical energy and sent out via the shaft. It is the job of the BEMF voltage to account for this; the BEMF voltage times the current through it is the instantaneous electrical power that is converted to instantaneous mechanical power and sent out via the shaft. The electrical equation of motion for a PMC machine is:

$$V = Ri + L \cdot \frac{di}{dt} + u \quad \text{Equation 5}$$

Where v and i are the terminal voltage and current, respectively, u is the BEMF, R is the winding resistance and L is the winding inductance. Multiplying the equation above by the current i results in:

$$Vi = Ri^2 + \frac{d}{dt} \cdot \frac{1}{2} \cdot (L \cdot i^2) + ui \quad \text{Equation 6}$$

This is an energy conservation experiment that states that the power in (vi) goes either to heat ($Ri^2$), stored magnetic energy (d/dt( . . . )), or into the BEMF, which represents the mechanical side of the machine. Thus ui is torque times speed, or mechanical power out. Finally, going back to equation 1, note that if i=0, i.e., if the machine is open circuit, then v=u, and so the measured terminal voltage at a speed that represents the operational speed equals the BEMF for that particular speed.

Since a PMC machine contains multiple phases, with multiple voltages, currents and flux linkages, one set for each phase must be considered. This is accomplished by creating appropriate vectors (V, I, Lambda, K) and matrices (R, L), and then by using the equations above. So, V, I and Lambda become column vectors of the voltage across, the current through, and the flux linked by each phase. K then becomes a column vector of the flux linkage components due to the magnets, which is a function of rotor position. R becomes a resistance matrix with resistances along the diagonal, and zeros off the diagonals. Finally, L becomes an inductance matrix with self inductances down the diagonal, and mutual inductances on the off diagonals. Note that L will be a symmetric matrix since the mutual inductance from one phase to another is the same as the reverse mutual inductance, or, put mathematically, Lm,n=Ln,m.

Figure 15:
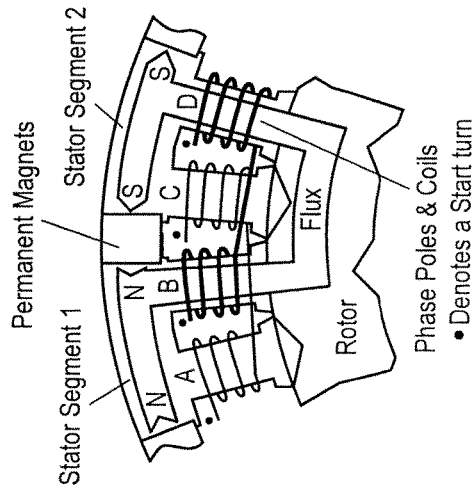
FIG. 15 shows a section of the rotor and stator that comprise a phase section.

FIG. 15 shows a section of the rotor and stator that comprise a 'phase section.' A 'phase section' is the building block for a PMC machine. The components that comprise a 'phase section' consist of at least two stator poles on a stator segment placed adjacent and between two north permanent magnet pole faces and a second stator segment with an equal number of poles placed adjacent and between two south permanent magnet pole faces. A coil is placed on each of the stator poles. A 'single phase section' can be repeated more than once in a PMC design as will be apparent when looking at the geometries for two, three and six phase PMC machines.

Figure 16:
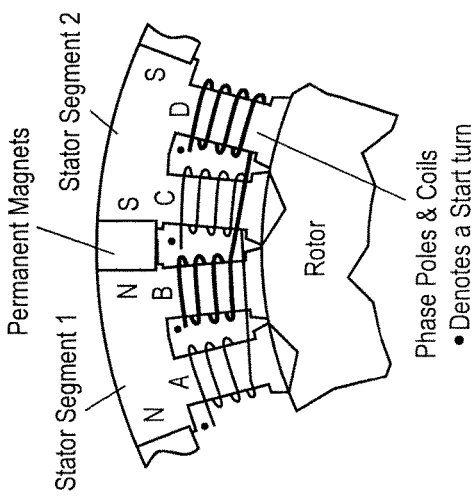
FIG. 16 shows a case where no phase coils are energized.

Both phase coils on the poles between two permanent magnet north poles will always be energized with current in the same direction. The coils on the poles between two permanent magnet south poles will always be energized with current in the opposite direction to the coils on the poles between permanent magnet north poles. For example in the six phase version in FIG. 16 if coils 'A' and 'C' are energized and assuming the coils are wound in the same direction about the poles, current will enter the start turn of coil 'A' and exit the start turn of coil 'C.' Therefore, a unidirectional current is applied to all of the coils and its direction is determined by whether the coil resides between either a north or south permanent magnet pole. The direction the unidirectional current flows through a coil is determined by the left hand rule and would be where the coil's magnetic pole located on the magnet side forms a couple with the magnet. For example if a coil is located between the North permanent magnet poles the coil's magnetic pole facing the permanent magnet would be energized to produce a South magnetic pole on the magnet side and a North magnetic pole on the rotor side. The 'A' and 'C' coils are 'on' when the 'B' and 'D' coils are off or vice versa or alternately energized. This would mean that only one of the two poles between permanent magnet North poles and only one of the two poles between permanent magnet South poles would be energized at any given time but allowing for some overlap in the coil's 'turn on' and 'turn off' timing. Some exceptions to the unidirectional current might be implemented as shown in the example of FIG. 16, there is a first unidirectional current in the coils 'A'' and 'C' and a second unidirectional current in coils 'B' and 'D', where the second unidirectional current flows in the opposite direction of the first unidirectional current. In this case both coils between 'like' permanent magnet poles are energized in opposite directions but with different magnitudes of current where one coil is energized to produce a flux linkage between the rotor and stator (normal current direction) and the other coil is energized only to the point to prevent a flux linkage or couple between the rotor and stator (opposite to the normal current direction). Cases exist where bidirectional current can be used; such cases are shown in FIGS. 20 & 21.

FIG. 16 shows a case where no phase coils are energized. The flux from the permanent magnets' north poles would traverse though the lowest reluctance path, through pole 'B,' through the rotor and then return to the permanent magnets' south poles through pole 'D,' where the flux is illustrated as the blue region.

FIG. 17 shows how the flux from the permanent magnets adds and is directed through a given set of stator poles by selectively energizing phase coils. Coils 'A' and 'C' are energized to produce the shown magnetic polarities. The flux from the two permanent magnet north poles combine and traverse pole 'A' through the rotor and returns through pole 'C' to the permanent magnets' south poles.

Since rotor poles are not aligned with poles 'A' and 'C,' a torque is produced on the rotor that will act to align rotor poles with stator poles 'A' and 'C.' It would be obvious that if viewed as a 'single phase section' (as in FIG. 17) the rotor direction would not be predictable. This unpredictability is mitigated when placed in a phased relationship with other like 'single phase sections.'

If the rotor is in an angular position where rotor poles are not in alignment with poles 'B' and 'D' and if the pole coils for poles 'B' and 'D' were energized to have the magnetic polarities (as shown in FIG. 18), a torque would be produced to bring the rotor poles in alignment with stator poles 'B' and 'D.'

By adjusting the length of the permanent magnet pole faces 'L1' and 'L2' in FIG. 19, the flux across a stator pole of length 'L3' can be adjusted to be equal to the air gap flux densities achievable in a field wound machine. The PMC machine geometry is superior because it makes that possible without adding the copper weight and suffering additional $I^2R$ losses, as would be the case in a field wound machine.

In FIG. 20-A, phase coils 'B' and 'D' are energized only to the point that the flux through poles 'B' and 'D' is opposed and redirected to poles 'A' and 'C.' That would have a similar effect as shown in FIG. 17. The current flowing in the phase coils when opposing the permanent magnet's flux would need to be controlled to prevent the production of an opposing flux greater than the amount needed to be displaced. In theory, phase coils 'A' and 'C' could be eliminated and coils 'B' and 'D' could be fed a bidirectional current that either opposes or redirects the permanent magnets' flux to the proper poles. In FIG. 20-B, all of the phase coils are energized both to oppose and displace ('B' and 'D') or to aid and redirect ('A' and 'C') the flux from the permanent magnets.

The most compelling reason for using a bidirectional current in a phase coil within a PMC machine is to dissipate any stored energy in a phase coil at a 'switch off' event. The dissipation of the stored energy is the major source of noise in a switched reluctance [SR] machine since a brief opposing torque is created when current is snubbed off just as a rotor and stator pole come into alignment.

In a PMC machine, just prior to a rotor and stator pole coming into full alignment (FIG. 21), the stored energy in phase coils 'A' and 'C' is dissipated in phase coils 'B' and 'D.' The returned stored energy flowing into coils 'B' and 'D' is in the same direction as the supply and opposes the flux from the permanent magnets, which acts to maintain the flux through poles 'A' and 'C' as the rotor moves into alignment. This allows the returned energy to be dissipated in a manner that supports rotation, thereby reducing the need for complex energy recovery circuits as used in SR machines and allowing for quieter operation.

A PMC rotating machine can contain a wide variety of phases. QM Power is presently focusing on two, three and six phase machines where a two phase machine provides a lower cost solution and a premium six phase machine provides higher power density with extremely low torque ripple. The three phase PMC machine will serve the majority of market applications. These three offering types will allow a PMC machine to be cost competitive with superior performance in a cost driven market or provide superior performance in a performance driven market.

Figure 22:
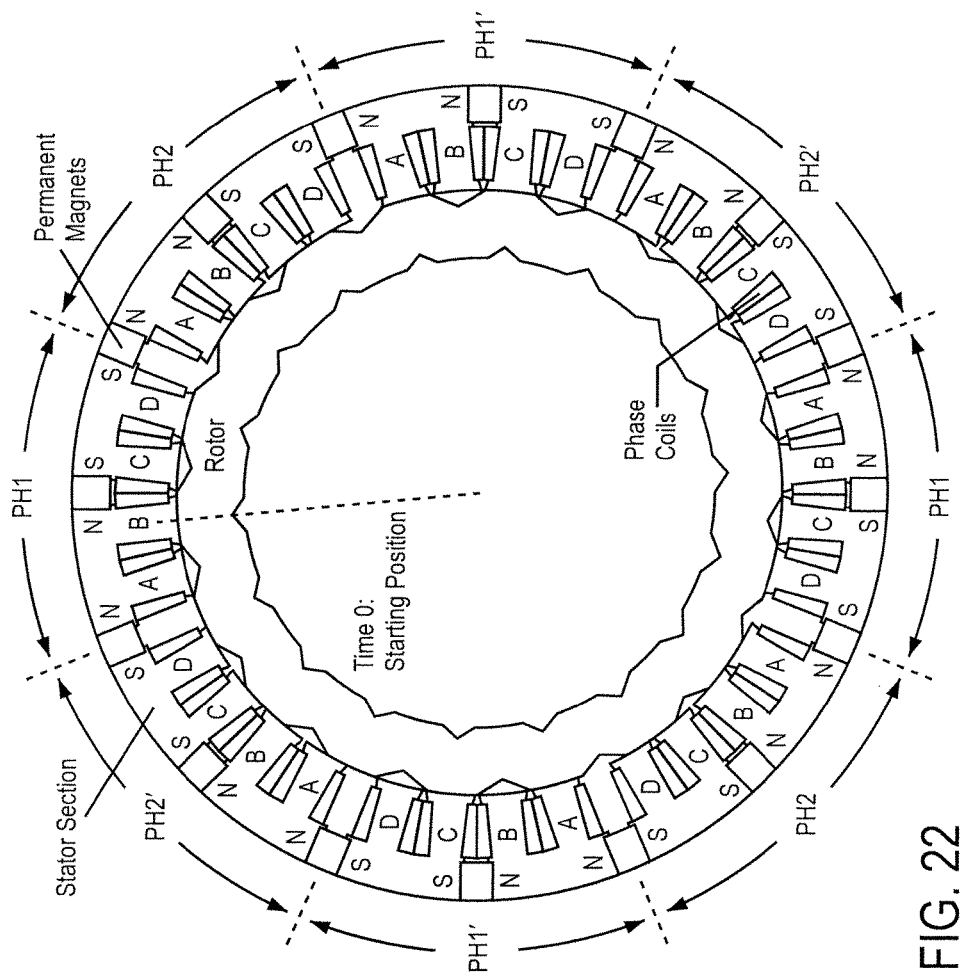
FIG. 22 shows a PMC two phase machine geometry.
Figure 24:
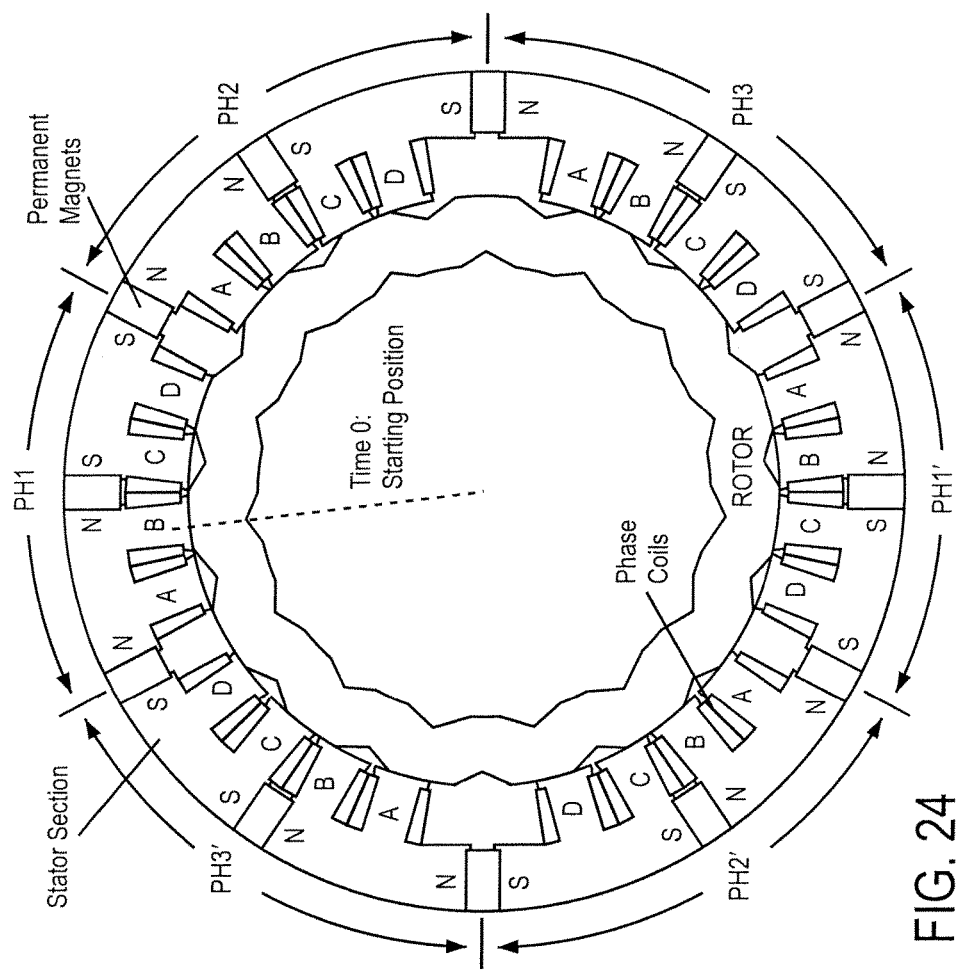
FIG. 24 shows a three phase PMC machine.
Figure 26:
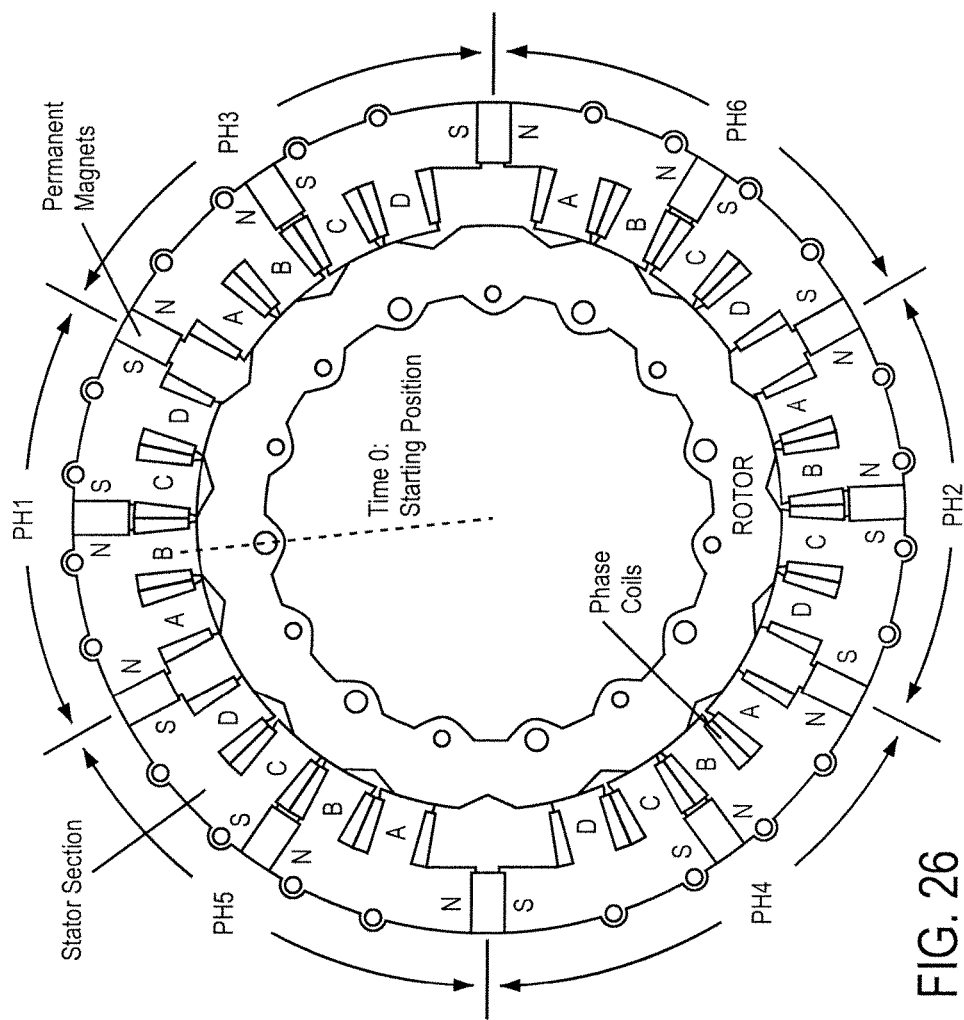
FIG. 26 shows a six phase PMC machine.

A PMC two phase machine geometry is shown in FIG. 22 and, as can be seen, it is made up of 'phase sections' as depicted in FIGS. 15 through 18. In the PMC two phase machine every other 'phase section' is offset by 90 electrical degrees. PH1 and PH1' can be thought of as mirror images of each other because as PH1 poles 'A' and 'B' leave alignment, poles 'C' and 'D' approach alignment; as that happens in PH1, the opposite is happening with PH1' because poles 'A' and 'B' would be approaching alignment while PH1' poles 'C' and 'D' would be leaving alignment. This same relationship exists between the poles of PH2 and PH2'. Four 'phase sections' make up phase 1 and its complement phase 1' and four 'phase sections' make up phase 2 and phase 2'. A timing sequence is shown in FIG. 23. A three phase PMC machine is shown in FIG. 24 along with its timing sequence in FIG. 25. A six phase PMC machine is shown in FIG. 26 along with its timing sequence in Figure.

As with an SR machine, a PMC machine does not have a steady-state equivalent circuit as compared to AC and DC machines as a result of the non-linear characteristics as suggested by equation 3. A PMC machine has the following features:

1. A PMC machine has unidirectional current producing unidirectional torque as opposed to AC machines and all DC machines, except those in the SR motor class. Since only one switch is required to control current in a phase this reduces the number of power converter switches and makes the drive more economical. There is no shoot through failure mode since a phase switch only faces one side of the power source.
2. The torque constant is given by the slope of the PM flux vs. rotor position and L(Theta,i) making it non-linear and thus impossible to derive a simple equivalent circuit.
3. A PMC motor has high starting torque like a series DC motor, the workhorse for traction applications. A PMC motor, however, would be lighter and more efficient than a series motor given that the field wound coils are replaced with permanent magnets.
4. Permanent magnet flux varies with rotor position and thereby allows for comparably higher performance generating action, another attractive characteristic for automotive applications.
5. The direction of rotation is easily controlled by changing the phase excitation sequence.
6. Features 1, 4 and 5 make the use of a four quadrant controller possible.
7. Torque and speed are controlled by altering the phase excitation voltage.
8. Current PMC designs do not operate directly from a three phase line supply without a power converter. In order to be cost competitive with lower cost fixed speed induction motors, a synchronous squirrel cage PMC motor is being developed.
9. Due to the reduction of power switches in the converter and simplified rotor design, a PMC machine will provide superior performance over other PM motors at a lower cost.
10. Since rotor position can be accurately controlled a PMC machine is also suitable for precision high performance servo-motor applications.
11. All of the phases in a PMC machine are 'electrically independent' therefore a fault in one phase has no effect on the other operational phases. A fault in a single phase in almost all other phased motors types, with the exception of an SR motor, has catastrophic implications. This feature is especially beneficial for machines used in 'high risk' applications such as motors, generators and actuators used for aerospace, defense, medical, nuclear, traction and electric vehicles, chemical handling, etc.
12. The performance due to the loss of a phase, in a multiphase machine, is diminished as a function of the number of machine phases. As the number of phases increases the impact on performance from the loss of any one phase is reduced. A PMC machine can be easily configured to virtually any number of phases for both motors and generators.
13. No repelling fields are used, thus negating the associated losses and power density reduction associated with their use; it also allows for faster current rise times for producing higher torque at higher speeds.
14. With a PMC geometry, where the magnets are placed on the stator, the ratios of the total magnet length to the length of a pole face is such that high gap densities can be achieved in a light weight and low loss PM configuration. The high gap flux densities increase the PMC machine's power density when operating as a motor or as a generator.
15. A PMC machine does not use cross rotor flux linkages, nor does the rotor serve as PM 'back iron' as with other PM machines. The resulting significant reduction in the rotor and overall machine weight is a beneficial feature for many applications and can be particularly important for improving the performance of larger machines, including wind turbine generators.
16. A PMC machine has no attached components on the rotor, i.e., permanent magnets. This feature allows for holding a smaller and more consistent air gap length, increases reliability and allows the machine to operate at much higher rotational speeds when operated as a motor or generator.
17. The PMC geometry is equally applicable to non-rotary applications such as actuators, linear motors, linear generators, high power latches, etc.
18. A PMC machine's phases are geometrically independent and do not rely upon overlapped phase poles. This feature not only increases the effective pole areas, it additionally isolates the phases from mutual inductance.

Finding reliable and complete competitive variable speed motor data is challenging, particularly for smaller scale devices, where efficiency tends to be lower. Most motor manufacturers only publish what they want a prospective customer to see or only the highest performance range on a particular motor's operating curve.

One of the most common misconceptions in the scientific and engineering community is that 'motors already operate in the 90 plus percent efficiency range' when in fact motors have a wide range of efficiencies not just one efficiency.

Efficiency is determined by many factors, including what RPM output level the motor is operating at within its capacity range, by the controlling methods employed, by the power density (weight) of the motor, and whether or not any active cooling is used; a full understanding of these factors is required to evaluate the intrinsic technical value proposition of the machine. Since few of these metrics, other than individual peak efficiencies and weights are typically provided in manufacturers' product specifications, it is often difficult to determine which option represents the best choice for an application. The analysis below focuses on the physics that define a particular motor geometry and examines the relationship between motor size, output level and efficiency.

To begin, it is important to understand that efficiency normally improves as a rotating electrical machine increases in diameter since the flux path length tends to scale linearly with size. So, for a given flux density, and hence shear stress, the amp-turns must scale linearly too. At the same time the winding cross section is increasing quadratically, and so the Ohmic loss is unchanged. On the other hand, the torque out (and power for a fixed speed) is growing quadratically at constant rotational speed, or at least linearly with constant tip speed. Thus, efficiency improves because output goes up while losses stay the same, all at a constant flux density.

All motors will have both high and low efficiencies over their full operating range and at 'no-load' and 'stall' efficiency will even be zero. If a competitive motor curve only shows high efficiencies they are either not showing the entire operating range of the underlying motor or they are using controlling methods on an oversized motor, on that the device can run at a lower power than the machine is capable of but at a higher point on its intrinsic efficiency curve.

Figure 28A:
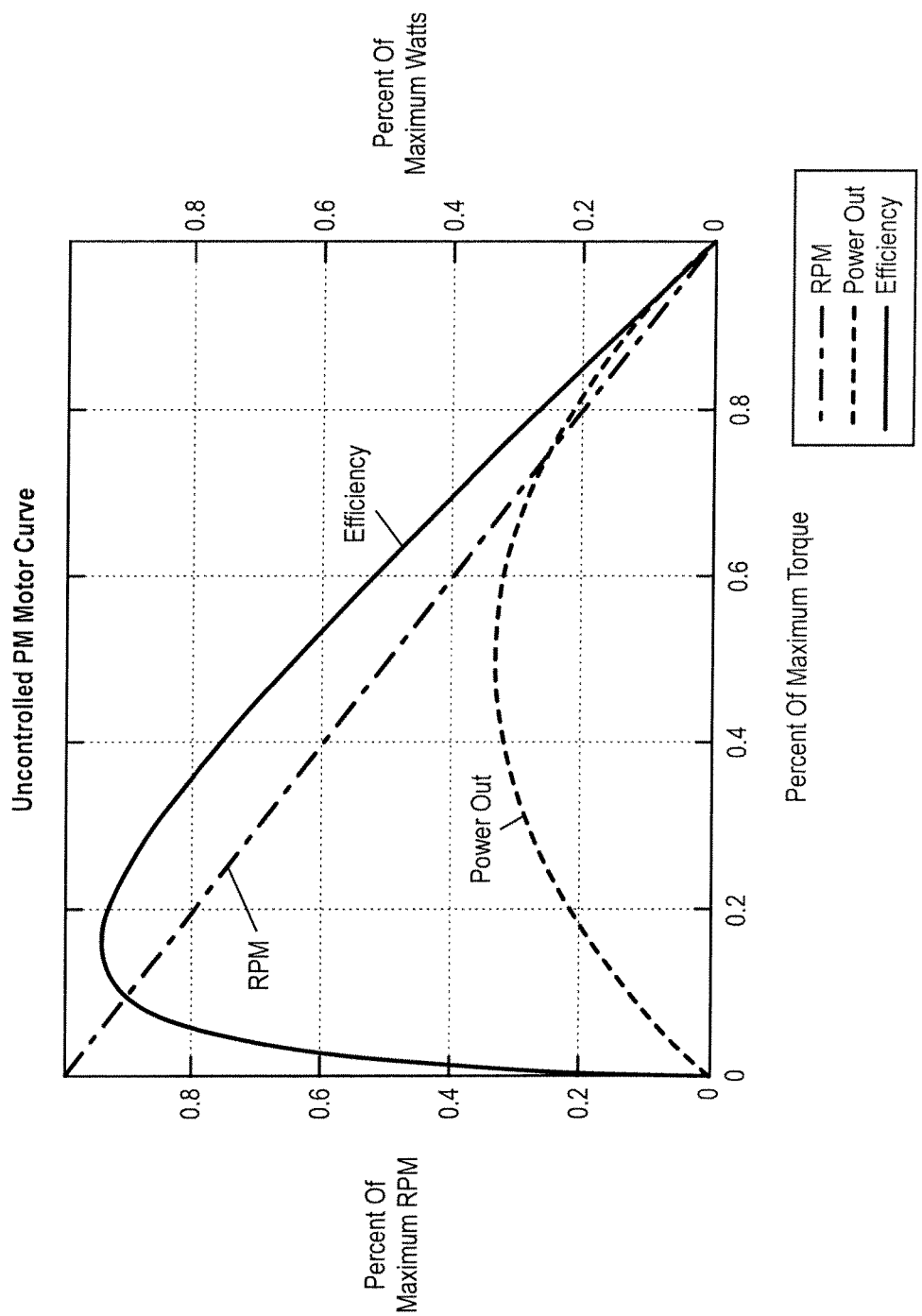
FIG. 28 shows a typical uncontrolled (left) and controlled (right) PM motor curve.
Figure 28B:
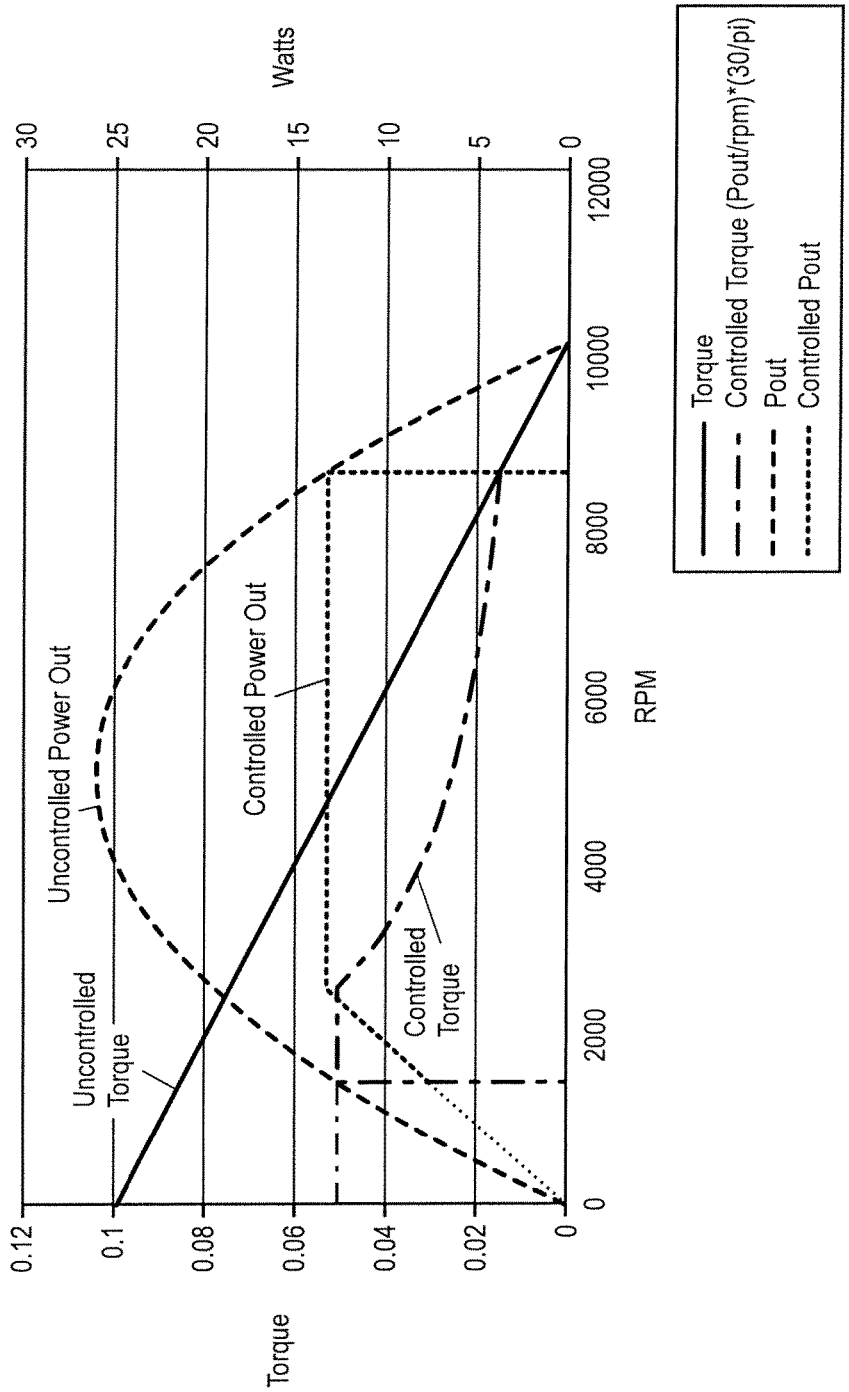
Figure 30:
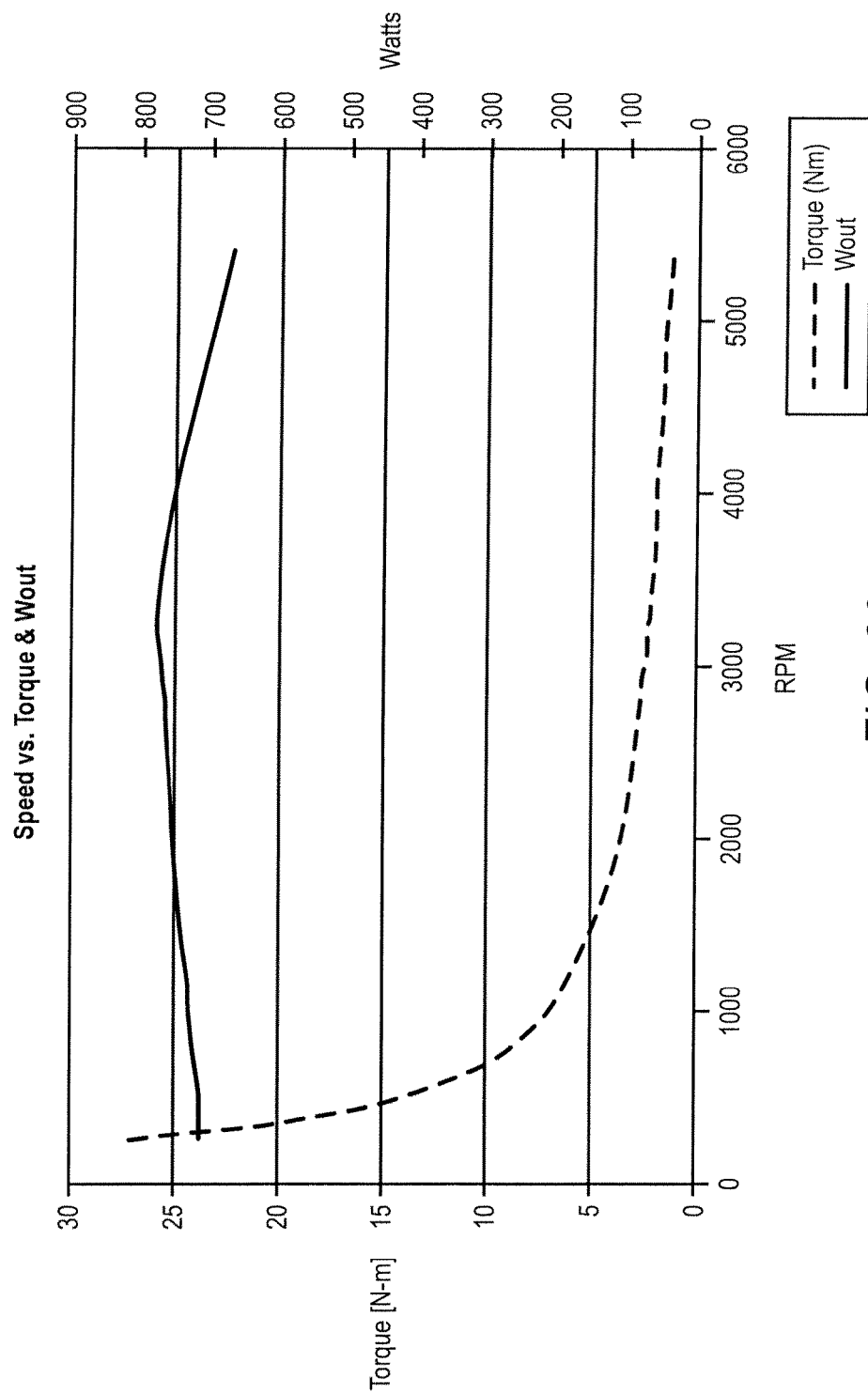
FIG. 30 is a speed vs. torque & watts out curve speed vs. torque curve for a fixed commutation 6 phase 1 HP machine PMC geometry.
Figure 31:
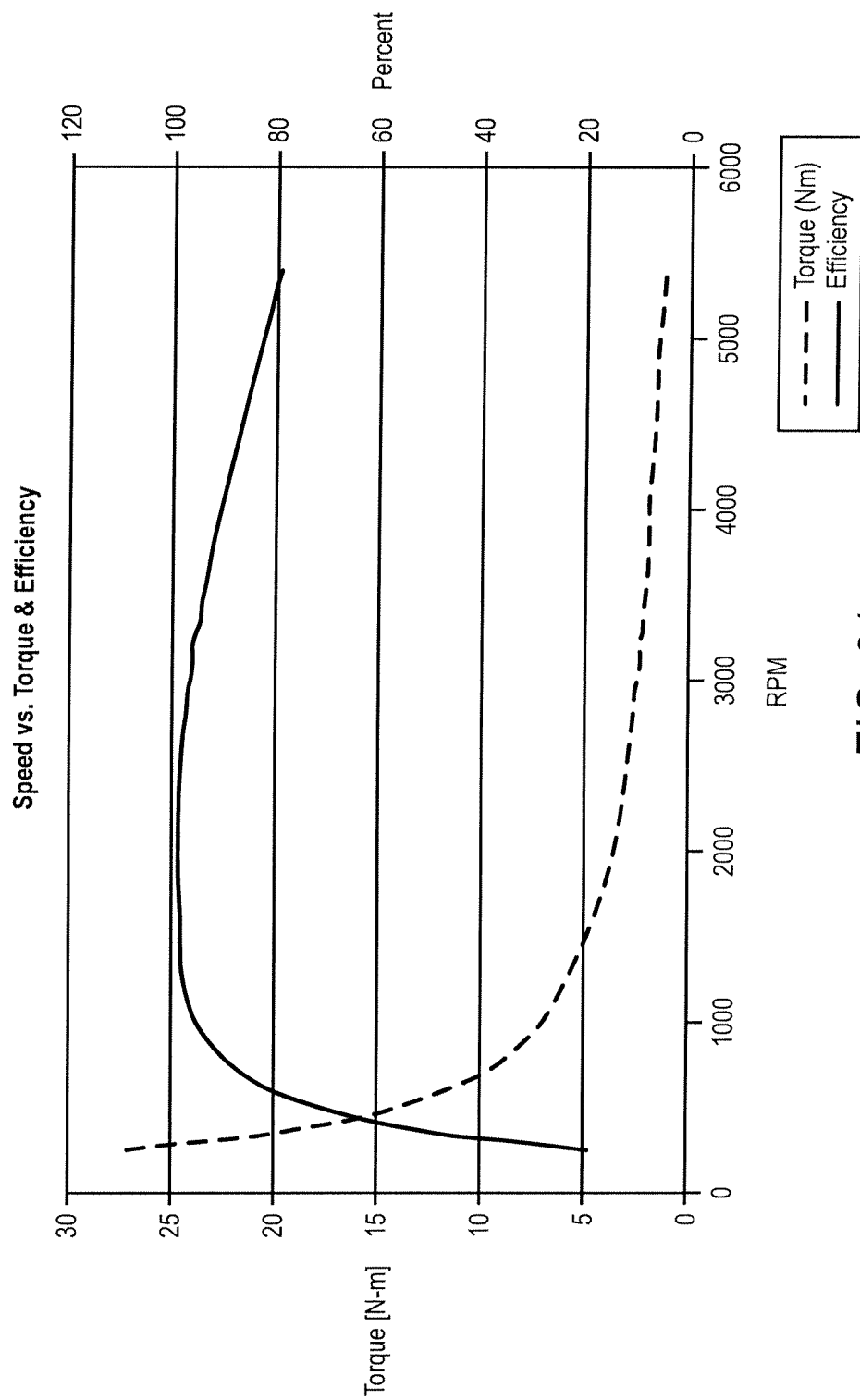
FIG. 31 shows the speed vs. torque curve for a fixed commutation 6 phase 1 HP machine with PMC geometry.

The left side of FIG. 28 illustrates the uncontrolled speed-torque and efficiency curves for conventional PM motors which have an intrinsically linear speed-torque relationship. Since 'peak power' and 'peak efficiency' do not occur at the same point on the uncontrolled operating curve for the most widely used PM motor geometries, the challenge for motor designers was to find a way to obtain the high efficiency found near it's no load speed (i.e., at the maximum point of its efficiency curve) at a power output level that commercial applications require. While a fixed commutation (i.e., uncontrolled) PM motor is shown in the left graph of FIG. 28, the right side shows the same motor using controllers to limit 'power in' and 'power out.' FIG. 30 illustrates torque and power output as a function of RPMs. FIG. 31 illustrates torque as a function of RPMs.

The conventional solution has been to use a motor that is large enough to operate at the targeted application's power specifications without exceeding the higher intrinsic high efficiency range, and then using electronic control to limit the power output to operate in that range. However, as can be seen in the right side of FIG. 28, in order to achieve such high operational efficiency, the motor would have to have a peak power capacity between 30-50% greater than the actual range it is designed to be run at in the particular application. To obtain such a higher peak power, the motor has to be larger (oversized), thus increasing the weight of the machine. Since the cost of a motor is typically dominated by the steel and copper raw materials (i.e., the weight) and the control electronics (if needed) the costs of fabricating such conventional PM motors are necessarily higher than they would be for a motor with intrinsically higher efficiency over a wider range of uncontrolled operating speeds; such a motor would not need to be oversized since its peak output power would be near its peak efficiency. Again, a motor with those attributes would not need to be oversized, and would potentially eliminate (or at least minimize) the controller components, and would, therefore, lead to lighter and cheaper to build (and sell) alternatives offering the same power.

Figure 32A:
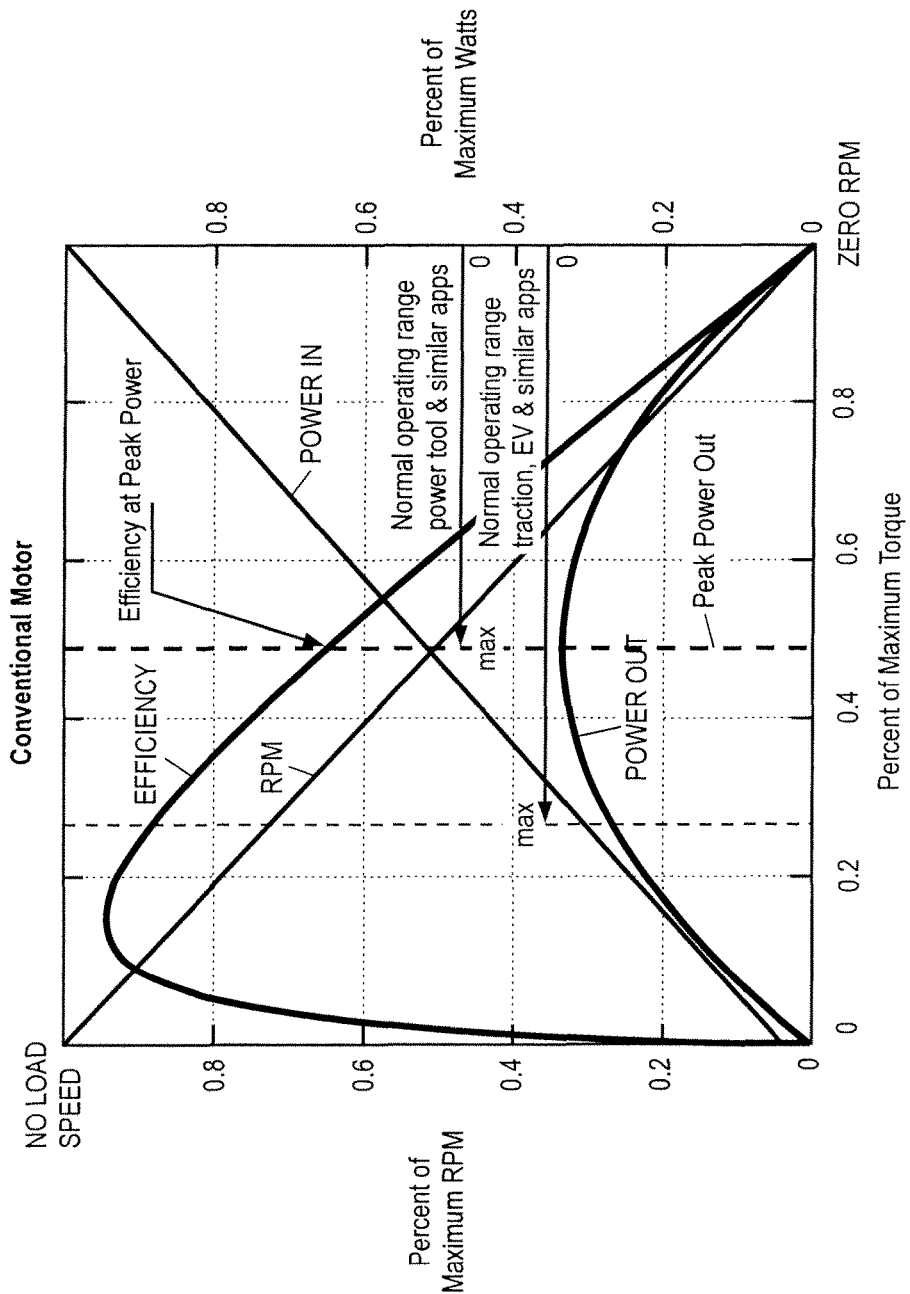
FIG. 32 illustrates performance advantages achieved over conventional motors in accordance with an embodiment of the invention.
Figure 32B:
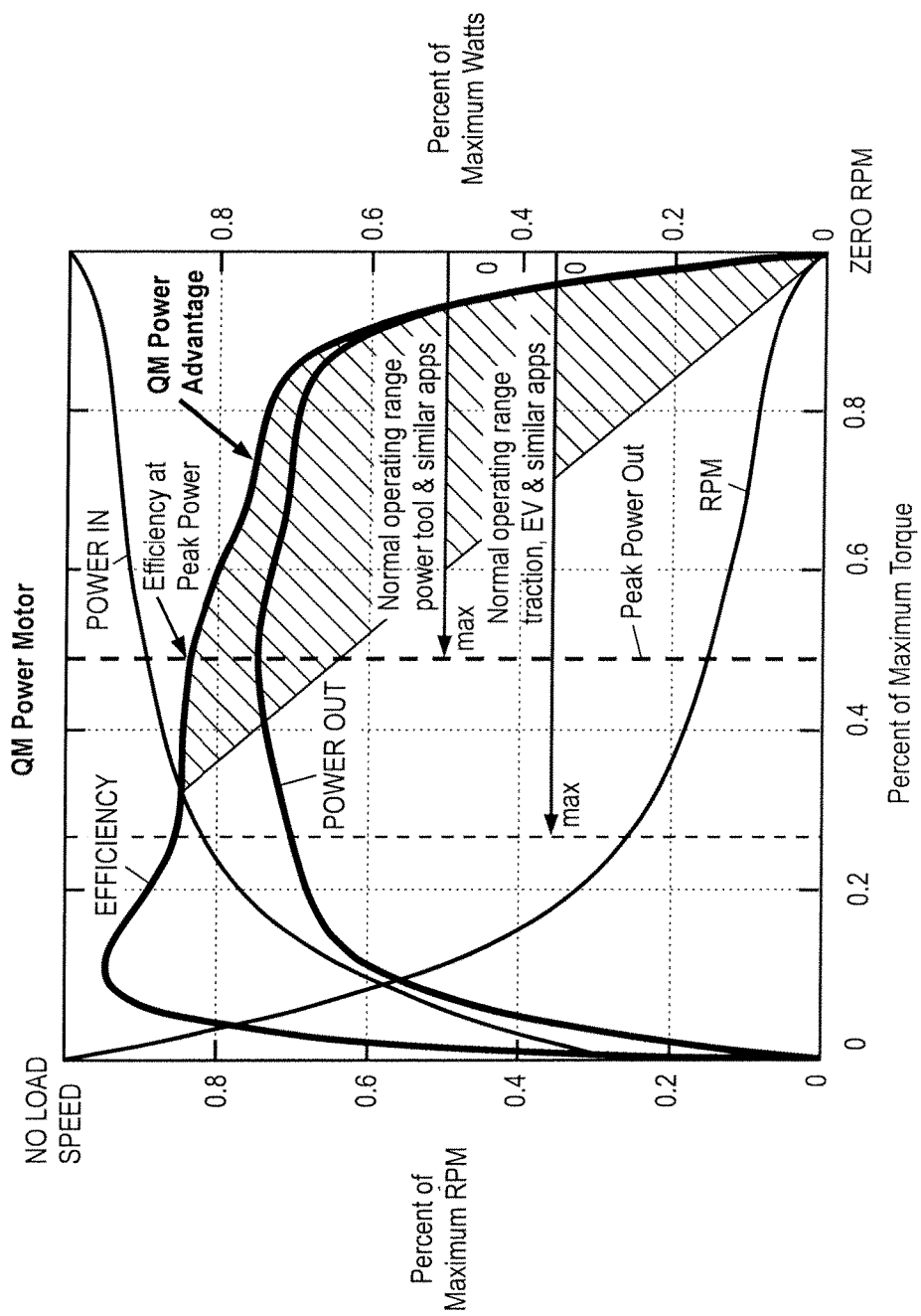

The design of the invention is the first commercially available motor that doesn't need to be oversized to meet the efficiencies demanded by the motor marketplace. The invention obtains its cost advantages by having an intrinsic hyperbolic uncontrolled speed-torque curve, which leads to an almost rectangular efficiency curve. For the disclosed motor, the no load and stall efficiencies are still zero but they quickly climb above 90% and hold across the operating range of speeds of the device (see FIG. 32 below)—an especially important quality for variable speed applications. The disclosed motor allows one to obtain peak power at or near the machine's intrinsic peak efficiency. While the weight of a motor is not linear to the power output, the intrinsic peak efficiency of the linear speed torque curve of an uncontrolled conventional PM motor occurs at a point that is approximately 27% lower than that of its peak power.

FIG. 29 is a comparison of the expected power density, efficiency and speed benefits of the QM Power alternative compared to market leading alternatives for variable speed automotive applications.

Importantly, there are no known manufacturing or materials limitations with a PMC Machine that prevent rapid commercialization. Aside from the automotive market, the prospect of a motor with smaller size and lower weight, but with the same or higher efficiencies and output speeds, is a significant value proposition for a variety of applications.

FIG. 31 is the speed vs. torque curve for a fixed commutation 6 phase 1 HP machine with PMC geometry. Efficiency remained above 90% for over 50% of the range. Due to their linear speed torque curve, incumbent 1 HP machine alternatives that produce 1 HP at values above 90% efficiency with fixed commutation will only remain above 90% efficient for ~15% of their operating range, as illustrated in the left hand graph of FIG. 32. Efficiencies above 90% occur in this graph only from where the efficiency curve crosses the torque curve on the left side of the graph to the first dotted vertical line on the left side of the graph.

Figure 33:
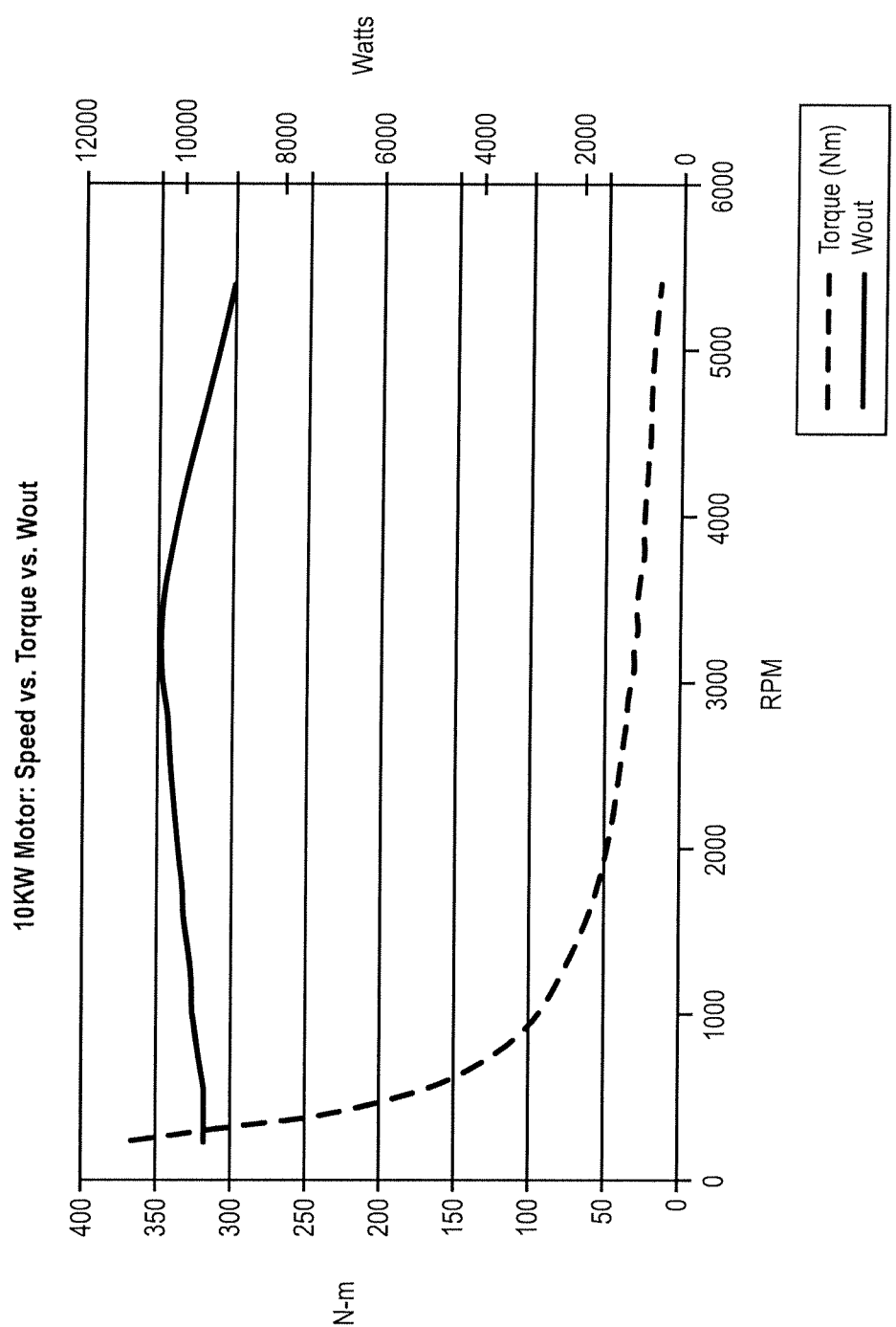
FIG. 33 shows a speed vs. torque and power out for a 10 KW motor.
Figure 34:
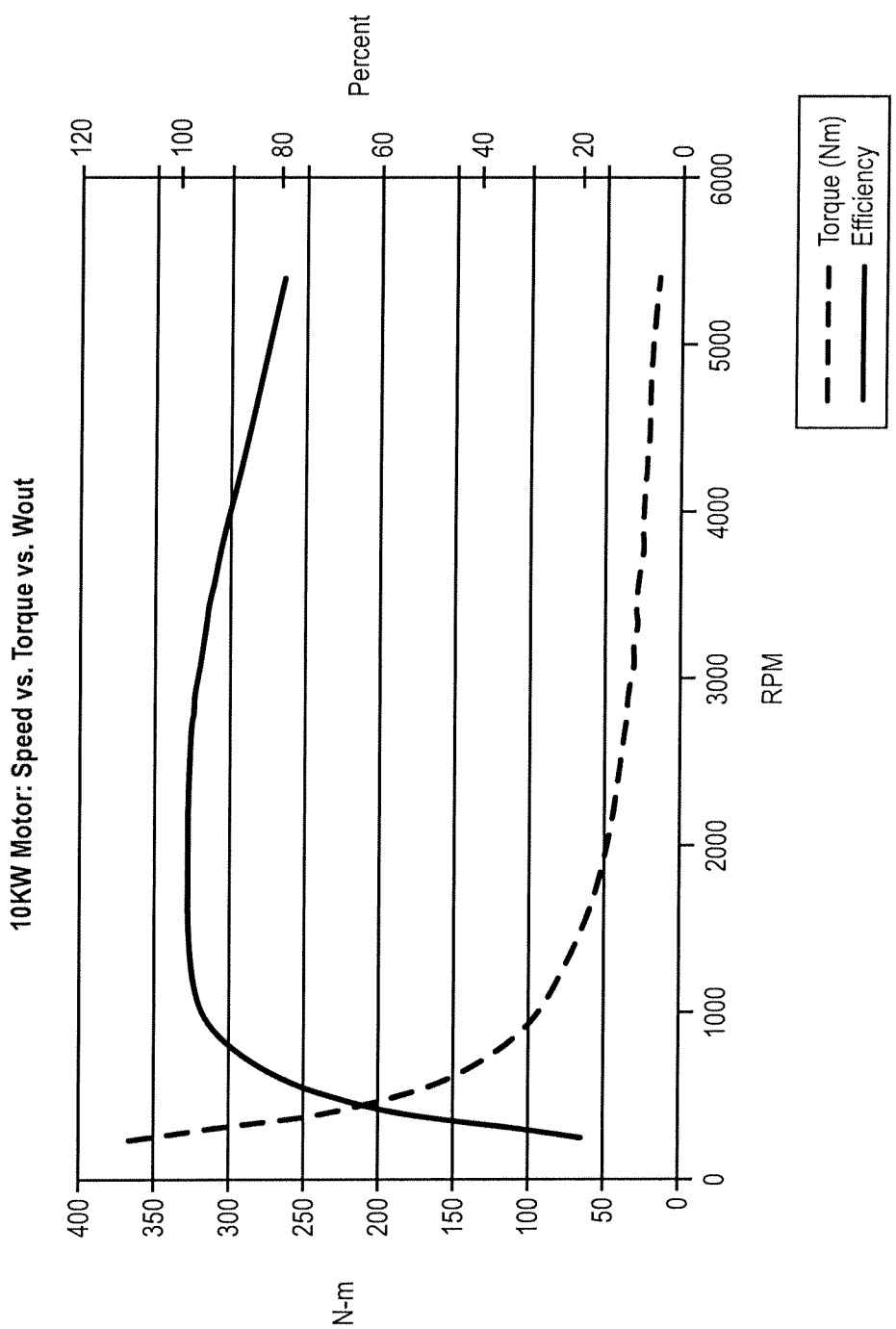
FIG. 34 shows speed vs. torque and efficiency in accordance with an embodiment of the invention.

As suggested by the PMC motor equations presented earlier, speed and torque scale proportionally for a PMC motor based upon input voltage. The input voltage was held constant during the testing, therefore constant power was produced at 1 HP for the above graphs. The Opera-RM analysis results of a 10 KW PMC motor are shown in FIGS. 33 and 34. FIG. 33 shows a speed vs. torque and power out for a 10 KW motor and FIG. 34 shows speed vs. torque and efficiency. Using curve fitting on the speed vs. torque for 1 KW, 10 KW and 50 KW motors we found that torque is a function of speed to the power of −0.98 for all cases, indicating that scaling is indeed quadratic. An Opera RM FEA analysis of the disclosed technology suggested that a continuous 50 KW motor with a peak torque of 200 N-m could be developed with a proposed motor diameter of 250 mm, a length of 150 mm with a weight of approximately 32 Kg—all within the given acceptable parameters.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A machine, comprising:
a rotor without magnets; and
a stator comprising a plurality of phase sections, each phase section corresponding to one of a plurality of electrically independent phases of the machine and each phase section having pairs of pole faces of permanent magnets arranged with same facing magnetic poles in which a magnetic pole of a permanent magnet faces a same magnetic pole of another permanent magnet, a plurality of stator poles between the same facing permanent magnet pole faces, and a winding on each of the stator poles.

2. The machine of claim 1 wherein the stator poles of each phase section comprise four stator poles which, when viewed in a clockwise direction, first and third stator poles are electrically 180 degrees out of phase with second and fourth stator poles.

3. The machine of claim 2 wherein the windings on the first and third stator poles are alternately energized with respect to the windings on the second and fourth stator poles.

4. The machine of claim 1 wherein the stator poles and permanent magnetic pole faces of each phase section comprise two stator poles between two north same facing permanent magnet pole faces and two other stator poles between two south same facing permanent magnet pole faces.

5. The machine of claim 4 wherein the windings on the stator poles are energized with current in a same first direction, and the windings on the other stator poles are energized with current in a same second direction opposite the same first direction.

6. The machine of claim 1 wherein windings on two stator poles of each phase section are energized with current in a same first direction, and windings on two other stator poles of each phase section are energized with current in a same second direction opposite the same first direction.

7. The machine of claim 1 wherein:
each phase section has first and second stator poles between two north permanent magnet pole faces and third and fourth stator poles between two south permanent magnet pole faces, the first stator pole having a first winding wound about the first stator pole, the second stator pole having a second winding wound about the second stator pole, the third stator pole having a third winding wound about the third stator pole, and the fourth stator pole having a fourth winding wound about the fourth stator pole;
the first and third windings are wound in a same first direction and energized with first current in the same first direction; and
the second and fourth windings are wound in a same second direction and energized with second current in the same second direction opposite the same first direction.

8. The machine of claim 7 wherein the first current enters a first start turn of the first winding and exits a second start turn of the third winding, and the second current enters a third start turn of the second winding and exits a fourth start turn of the fourth winding.

9. The machine of claim 7 wherein the first current causes magnetic flux from the north permanent magnet pole faces to traverse from the first coil through the rotor and through the third coil to the south permanent magnet pole faces.

10. The machine of claim 9 wherein the second current causes magnetic flux from the south permanent magnet pole faces to traverse from the fourth coil through the rotor and through the second coil to the north permanent magnet pole faces.

11. The machine of claim 1 wherein:
each phase section has first and second stator poles between two first same facing permanent magnet pole faces and third and fourth stator poles between two second same facing permanent magnet pole faces, the first stator pole having a first winding wound about the first stator pole, the second stator pole having a second winding wound about the second stator pole, the third stator pole having a third winding wound about the third stator pole, and the fourth stator pole having a fourth winding wound about the fourth stator pole;
the first and third windings are wound in a same first direction and energized with first current in the same first direction; and
the second and fourth windings are wound in a same second direction and energized with second current in the same second direction opposite the same first direction.

12. The machine of claim 1 wherein the machine comprises at least one of a two phase machine, a three phase machine, and a six phase machine.

13. The machine of claim 1 wherein the machine comprises at least one of a two phase motor, a three phase motor, and a six phase motor.

14. The machine of claim 1 wherein the machine produces unidirectional torque.

15. The system of claim 1 wherein the stator poles in each phase section are adjacent one another and have a same pitch to the rotor.

16. The machine of claim 1 wherein the permanent magnet pole faces comprise:
two north same facing permanent magnet pole faces; and
two south same facing permanent magnet pole faces.

17. The machine of claim 16 wherein the stator poles comprise:
at least two stator poles between the two north same facing permanent magnet pole faces; and
at least two other stator poles between the two south same facing permanent magnet pole faces.

18. The machine of claim 1 wherein the pole faces of the permanent magnets and stator poles of each phase section comprise:
two north same facing permanent magnet pole faces;
two south same facing permanent magnet pole faces;
at least two stator poles between the two north same facing permanent magnet pole faces;
at least two other stator poles between the two south same facing permanent magnet pole faces, the at least two other stator poles being equal in number to the at least two stator poles.

19. The machine of claim 1 wherein the windings are energized with only a unidirectional current.

20. The machine of claim 1 wherein the machine comprises at least one of a motor and a generator.

21. A method comprising:
providing a machine comprising:
a rotor without magnets; and
a stator comprising a plurality of phase sections, each phase section corresponding to one of a plurality of electrically independent phases of the machine and each phase section having pairs of pole faces of permanent magnets arranged with same facing magnetic poles in which a magnetic pole of a permanent magnet faces a same magnetic pole of another permanent magnet, a plurality of stator poles between the same facing permanent magnet pole faces, and a winding on each of the stator poles.

22. The method of claim 21 further comprising providing the stator poles of each phase section with four stator poles which, when viewed in a clockwise direction, first and third stator poles are electrically 180 degrees out of phase with second and fourth stator poles.

23. The method of claim 22 further comprising alternately energizing the windings on the first and third stator poles with respect to the windings on the second and fourth stator poles.

24. The method of claim 21 further comprising providing the stator poles and magnetic pole faces of each phase section with two stator poles between two north same facing permanent magnet pole faces and two other stator poles between two south same facing permanent magnet pole faces.

25. The method of claim 24 further comprising energizing the windings on the stator poles with current in a same first direction, and energizing the windings on the other stator poles with current in a same second direction opposite the same first direction.

26. The method of claim 21 further comprising energizing windings on two stator poles of each phase section with current in a same first direction, and energizing windings on two other stator poles of each phase section with current in a same second direction opposite the same first direction.

27. The method of claim 21 further comprising providing:
each phase section with first and second stator poles between two north permanent magnet pole faces and third and fourth stator poles between two south permanent magnet pole faces, the first stator pole having a first winding wound about the first stator pole, the second stator pole having a second winding wound about the second stator pole, the third stator pole having a third winding wound about the third stator pole, and the fourth stator pole having a fourth winding wound about the fourth stator pole;
the first and third windings wound in a same first direction and energized with first current in the same first direction; and
the second and fourth windings wound in a same second direction and energized with second current in the same second direction opposite the same first direction.

28. The method of claim 27 wherein the first current enters a first start turn of the first winding and exits a second start turn of the third winding, and the second current enters a third start turn of the second winding and exits a fourth start turn of the fourth winding.

29. The method of claim 27 wherein the first current causes magnetic flux from the north permanent magnet pole faces to traverse from the first coil through the rotor and through the third coil to the south permanent magnet pole faces.

30. The method of claim 29 wherein the second current causes magnetic flux from the south permanent magnet pole faces to traverse from the fourth coil through the rotor and through the second coil to the north permanent magnet pole faces.

31. The method of claim 21 further comprising providing:
each phase section with first and second stator poles between two first same facing permanent magnet pole faces and third and fourth stator poles between two second same facing permanent magnet pole faces, the first stator pole having a first winding, the second stator pole having a second winding, the third stator pole having a third winding, and the fourth stator pole having a fourth winding;
the first and third windings wound in a same first direction and energized with first current in the same first direction; and
the second and fourth windings wound in a same second direction and energized with second current in the same second direction opposite the same first direction.

32. The method of claim 21 further comprising providing the machine as at least one of a two phase machine, a three phase machine, and a six phase machine.

33. The method of claim 21 further comprising providing the machine as at least one of a two phase motor, a three phase motor, and a six phase motor.

34. The method of claim 21 further comprising producing unidirectional torque by the machine.

35. The method of claim 21 further providing the stator poles in each phase section adjacent one another and having a same pitch to the rotor.

36. The machine of claim 21 further comprising providing the permanent magnet pole faces comprising:
two north same facing permanent magnet pole faces; and
two south same facing permanent magnet pole faces.

37. The method of claim 36 further comprising providing the stator poles comprising:
at least two stator poles between the two north same facing permanent magnet pole faces; and
at least two other stator poles between the two south same facing permanent magnet pole faces.

38. The method of claim 21 further comprising providing the pole faces of the permanent magnets and stator poles of each phase section comprising:
two north same facing permanent magnet pole faces;
two south same facing permanent magnet pole faces;
at least two stator poles between the two north same facing permanent magnet pole faces;
at least two other stator poles between the two south same facing permanent magnet pole faces, the at least two other stator poles being equal in number to the at least two stator poles.

39. The method of claim 21 further comprising energizing the windings with only a unidirectional current.

40. The method of claim 21 further comprising providing the machine as at least one of a motor and a generator.

41. A machine, comprising:
a rotor without magnets; and
a stator comprising a plurality of phase sections, each phase section corresponding to one of a plurality of electrically independent phases of the machine and each phase section having pairs of pole faces of permanent magnets arranged with same facing magnetic poles in which a magnetic pole of a permanent magnet faces a same magnetic pole of another permanent magnet, an even number of stator poles between the same facing permanent magnet pole faces, and a winding on each of the stator poles.

42. A machine, comprising:
a rotor without magnets; and
a stator comprising a plurality of phase sections, each phase section corresponding to one of a plurality of electrically independent phases of the machine and each phase section having a plurality of north permanent magnet pole faces arranged with north same facing magnetic poles, a plurality of south permanent magnet pole faces arranged with south same facing magnetic poles, a first plurality of stator poles between the north permanent magnet pole faces, a second plurality of stator poles between the south permanent magnet pole faces, and a winding on each of the stator poles, wherein same facing magnetic poles are a magnetic pole of a permanent magnet facing a same magnetic pole of another permanent magnet.

43. A method, comprising:
providing a rotor without magnets for a machine; and
providing a stator for the machine, the stator comprising a plurality of phase sections, each phase section corresponding to one of a plurality of electrically independent phases of the machine and each phase section having pairs of pole faces of permanent magnets arranged with same facing magnetic poles in which a magnetic pole of a permanent magnet faces a same magnetic pole of another permanent magnet, an even number of stator poles between the same facing permanent magnet pole faces, and a winding on each of the stator poles.

44. A method, comprising:
providing a rotor without magnets for a machine; and
providing a stator for the machine, the stator comprising a plurality of phase sections, each phase section corresponding to one of a plurality of electrically independent phases of the machine and each phase section having a plurality of north permanent magnet pole faces arranged with north same facing magnetic poles, a plurality of south permanent magnet pole faces arranged with south same facing magnetic poles, a first plurality of stator poles between the north permanent magnet pole faces, a second plurality of stator poles between the south permanent magnet pole faces, and a winding on each of the first plurality of stator poles and second plurality of stator poles, wherein same facing magnetic poles are a magnetic pole of a permanent magnet facing a same magnetic pole of another permanent magnet.

* * * * *